United States Patent
Tabata

(10) Patent No.: US 7,126,884 B2
(45) Date of Patent: *Oct. 24, 2006

(54) MAGNETO-OPTICAL RECORDING MEDIUM HAVING MULTIPLE MAGNETIC LAYERS

(75) Inventor: Masahiro Tabata, Kanagawa-ken (JP)

(73) Assignee: Victor Company of Japan, Limited, Kanagawa-ken (JP)

(*) Notice: Subject to any disclaimer, the term of this patent is extended or adjusted under 35 U.S.C. 154(b) by 494 days.

This patent is subject to a terminal disclaimer.

(21) Appl. No.: 10/337,354

(22) Filed: Jan. 7, 2003

(65) Prior Publication Data

US 2003/0133367 A1  Jul. 17, 2003

(30) Foreign Application Priority Data

Jan. 11, 2002 (JP) .......................... P2002-004655
Nov. 20, 2002 (JP) .......................... P2002-337120

(51) Int. Cl.
*G11B 11/00* (2006.01)

(52) U.S. Cl. .............................. 369/13.08; 369/13.46; 369/13.47

(58) Field of Classification Search ............. 369/13.08, 369/13.07, 13.06, 13.09, 13.42, 13.43, 13.45; 428/694 MM, 694 ML
See application file for complete search history.

(56) References Cited

U.S. PATENT DOCUMENTS 6,579,635 B1 * 6/2003 Krusin-Elbaum et al. ........................ 428/846.9
2003/0133366 A1 * 7/2003 Tabata ..................... 369/13.47

FOREIGN PATENT DOCUMENTS

| JP | 08-293135 | 11/1996 |
|---|---|---|
| JP | 10-092031 | 4/1998 |
| JP | 11-86372 | 3/1999 |
| JP | 2000-163815 | 6/2000 |
| JP | 2000-187898 | 7/2000 |
| JP | 2000-353344 | 12/2000 |
| JP | 2001-184447 | 7/2001 |
| JP | 2001-184746 | 7/2001 |
| JP | 2002-025136 | 1/2002 |

(Continued)

OTHER PUBLICATIONS

Magneto Optical recording medium, (JP, 2003-281,795), Tabata, Masahiro, Abstract only.*

(Continued)

*Primary Examiner*—Tan Dinh
(74) *Attorney, Agent, or Firm*—Nath & Associates PLLC; Gregory B. Kang; Stanley N. Protigal

(57) ABSTRACT

In a magneto-optical recording medium, a first magnetic layer is made of a material using a Gd—Fe film or a Gd—Fe—Co film as a base so that a magnetic field normalized based on saturation magnetization of a magnetic domain wall driving field can be smaller than 1. A second magnetic layer is made of a material using a Tb—Fe film or a Dy—Fe film as a base, to which a nonmagnetic element such as Al or Cr, and Co are added. A third magnetic layer is made of a material using a Tb—Fe—Co film or a Dy—Fe—Co film as a base, and an element concentration ratio (at. % ratio) of Tb or Dy to Fe—Co is set in a range of $24.5 \leq Tb \leq 26.5$ or $26.5 \leq Dy \leq 29.5$. Addition amounts of Co and a nonmagnetic element to each magnetic layer are adjusted to set Curie temperatures $Tc11$, $Tc12$, and $Tc13$ of the first, second and third magnetic layers to $Tc13 > Tc11 > Tc12$.

4 Claims, 16 Drawing Sheets

IRRADIATION DIRECTION OF LASER BEAM

FOREIGN PATENT DOCUMENTS

| | | |
|---|---|---|
| JP | 2002-197741 | 7/2002 |
| JP | 2002-208195 | 7/2002 |
| JP | 2002-216401 | 8/2002 |
| JP | 2003-203405 | 7/2003 |
| JP | 2003-272262 | 9/2003 |
| JP | 2003-317335 | 11/2003 |

OTHER PUBLICATIONS

Magneto-optical Recording Medium, (JP, 2003-272,263), Tabata, Masahiro, Abstract only.*

Magnetic Recording Medium, (JP, 2000-187,898), Shiratori Tsutomu, Abstract only.*

Signal Reproduction Method For Magnetic Recording medium, (JP, 11-086,372), Shiratori Tsutomu, Abstract only.*

Tabata, M., et al., "Stimulation of Wall Motion in Displacement Layer with Reduced Exchange Energy on DWDD Media". J. Magn. Soc., vol. 25, pp. 397-398, published on Nov. 14, 2000.

Imamura, N., "Ultra High Density Magnetooptical Recording", *Triceps Co.Ltd,* pp. 127-144, (May 16, 2000).

* cited by examiner

IRRADIATION DIRECTION
OF LASER BEAM

IRRADIATION DIRECTION
OF LASER BEAM

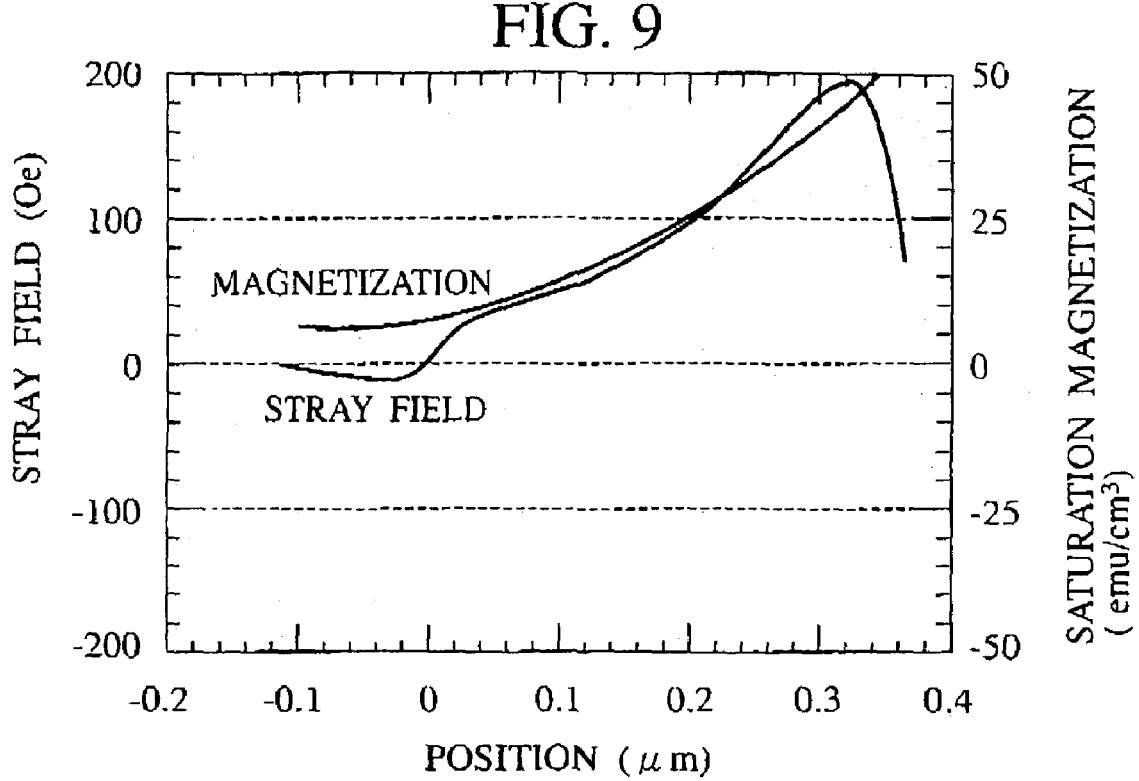
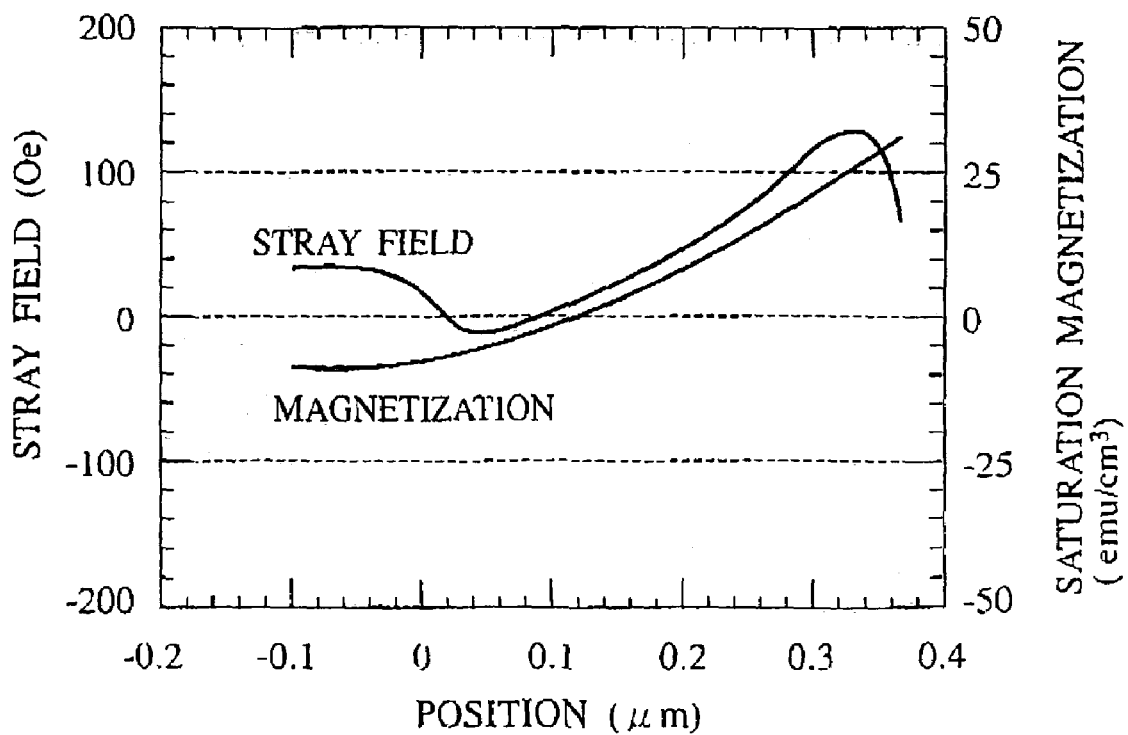

IRRADIATION DIRECTION OF LASER BEAM

IRRADIATION DIRECTION OF LASER BEAM

MAGNETO-OPTICAL RECORDING MEDIUM HAVING MULTIPLE MAGNETIC LAYERS

BACKGROUND OF THE INVENTION

1. Field of the Invention

The present invention relates to a magneto-optical recording medium for reproducing an information signal while causing a magnetic domain wall movement by laser beam irradiation.

2. Description of the Related Art

A basic principle of a magneto-optical recording system is that a temperature of a ferrimagnetic thin film is locally raised to the vicinity of Curie point or a compensation point, and a coercive force of this portion is reduced to reverse a direction of magnetization toward an externally applied recording magnetic field for an information signal to be recorded. The magnetization reversal portion, i.e., an information bit, forms a magnetic domain and, in magneto-optical recording/reproducing for reading the information bit based on magnetic Kerr effect, in order to increase a recording density, it is necessary to shorten a recording bit length, that is, to micronize a magnetic domain when the information signal is recorded in the form of the magnetic domain. However, reproducing resolution of the magnetic domain (information signal) is practically decided by a wavelength $\lambda$ of a laser beam source of an optical reproducing system and a numerical aperture NA of an objective lens, and a spatial frequency $2NA/\lambda$ is a reproducing limit. Accordingly, a conceivable way to increase a recording density is to shorten the wavelength $\lambda$ of the laser beam source or to reduce a spot diameter of a laser beam in a reproducing device side by using an objective lens of high NA. However, a wavelength of a laser beam source currently at a practical level is only about 640 nm, and the use of the objective lens of high NA results in a shallow focal depth, which requires accuracy of a distance between the objective lens and a magneto-optical recording medium (optical disk or optical card). Consequently, manufacturing accuracy of the magneto-optical recording medium becomes difficult to obtain. Therefore, NA of the objective lens cannot be increased so high, and practical NA of the objective lens is only about 0.6. In other words, there is a limit to the increase of the recording density by the wavelength $\lambda$ of the laser beam source and the numerical aperture NA of the objective lens.

In connection to this, to solve such problems of the recording density defined by conditions for reproducing, there is a signal reproducing method of a magnetic recording medium for executing reproducing on a magnetic recording medium (magneto-optical recording medium) where a magnetic layer is formed in a 3-layer structure (e.g., see Japanese Patent Laid-Open Hei No. 11(1999)-86372(p. 4, FIG. 1)). There is also a magnetic recording medium (magneto-optical recording medium) where a magnetic layer is formed in a 4-layer structure (e.g., see Japanese Patent Laid-Open No. 2000-187898 (p. 3 to 4, FIG. 1)).

FIG. 1 is a view for explaining an example of a conventional magneto-optical recording medium: (a) in FIG. 1 schematically shows a layer formation of the magneto-optical recording medium, and (b) in FIG. 1 shows a temperature distribution on the magneto-optical recording medium when the magneto-optical recording medium is irradiated with a laser beam. FIG. 2 is a view for explaining another example of a conventional magneto-optical recording medium: (a) in FIG. 2 schematically shows a layer formation of the magneto-optical recording medium, and (b) in FIG. 2 shows a temperature distribution on the magneto-optical recording medium when the magneto-optical recording medium is irradiated with a laser beam.

The conventional magneto-optical recording medium 110 in the example shown in FIG. 1 is disclosed in the above Japanese Patent Laid-Open No. Hei 11 (1999)-86372. The conventional magneto-optical recording medium 120 in the other example shown in FIG. 2 is disclosed in the above Japanese Patent Laid-Open No. 2000-187898. Here, description is briefly made by referring to the above publications.

First, as shown in FIG. 1, in the conventional magneto-optical recording medium 110 of the example, first to third magnetic layers 111 to 113 are sequentially laminated in a state of exchange coupling at room temperature. The first magnetic layer 111 disposed on a side irradiated with a reproducing laser beam to become a magnetic domain wall displacement layer is made of a magnetic film having a relatively small magnetic domain wall coercive force compared with the third magnetic layer 113 which becomes a recording layer. The second magnetic layer 112 is made of a magnetic layer having Curie temperature lower than those of the first and third magnetic layers 111 and 113.

More specifically, each of the above-described first to third magnetic layers 111 to 113 is made of a rare earth-iron family metal amorphous alloy containing 10 to 40 at. % of one or more types of rare earth metal elements such as Pr, Nd, Sm, Eu, Gd, Tb, Dy, Ho, and Er, and 60 to 90 at. % of one or more types of iron family elements such as Fe, Co, and Ni. It is also described that, to increase a corrosion resistance; a small amount of elements such as Cr, Mn, Cu, Ti, Al, Si, Pt, and In may be added to such an alloy.

In the magneto-optical recording medium 110 constituted in the foregoing manner, by laser beam irradiation from the first magnetic layer 111 side during recording, the information signal is recorded in the third magnetic layer 113 by a not-shown magnetic head to be saved as a magnetization reversal area of an arrow direction (hereinafter, described as a magnetic domain). Furthermore, after the recording, and during non-irradiation with a laser beam, the magnetic domain recorded in the third magnetic layer 113 is exchange-coupled to the first magnetic layer 111 through the second magnetic layer 112. In this case, vertical arrows AS in the first to third magnetic layers 111 to 113 indicate direction of atomic spins. On a boundary of areas where directions of spins are opposite to each other, a magnetic domain wall DW is formed.

Here, if the first magnetic layer 111 is irradiated with a laser beam during reproducing, a medium temperature reaches Curie temperature Ts or higher of the second magnetic layer 112 between shown positions X1 and X2 with respect to the laser beam. Correspondingly, in an area between the positions X1 and X2, because a temperature of the second magnetic layer 112 is raised to Curie temperature Ts or higher, magnetization thereof is lost to cut off the exchange coupling between the first and third magnetic layers 111 and 113. This area is referred to as a decoupling area.

Then, when the magnetic domain wall DW existing in the first magnetic layer 111 enters the decoupling area, this magnetic domain wall DW is moved toward a temperature peak in the first magnetic layer 111 as indicated by an arrow to generate magnetic domain wall movement DWM. Following this magnetic domain wall movement DWM, the magnetic domain exchange-coupled in the first magnetic layer 111 is enlarged by a reproducing laser beam to be read out. On the other hand, since a coercive force (magnetic domain wall coercive force) of the third magnetic layer 113 which becomes a recording layer is sufficiently large, the magnetic domain wall therein is not moved, and a recording state is maintained. Thus, the very small magnetic domain in which reproducing is impossible by normal reproducing resolution is enlarged to execute reproducing, whereby a recording density can be greatly increased.

Then, as shown in FIG. 2, in a conventional magneto-optical recording medium 120 of the other example, magnetic layers are formed by adding one more layer to the magneto-optical recording medium 110 of the foregoing example. Thus, performance is enhanced so that especially by laser beam irradiation, without simultaneous magnetic domain wall movements from the front and rear sides (directions of arrows I1 and I2) of a laser beam moving direction in a temperature elevated area which enables magnetic domain wall movement, only the magnetic domain wall movement from the front side (direction of the arrow I1) of the moving direction can be enlarged and read by a laser beam spot.

In the magneto-optical recording medium 120, first to fourth magnetic layers 121 to 124 are sequentially laminated in a state of exchange coupling at room temperature. The first magnetic layer 121 disposed on a side irradiated with a reproducing laser beam to become a magnetic domain wall displacement layer has a magnetic domain wall coercive force smaller than those of the second to fourth magnetic layers 122 to 124 at room temperature. The second magnetic layer 122 has a magnetic domain wall energy density higher than that of the first magnetic layer 121 at room temperature. The third magnetic layer 113 has Curie temperature set higher than room temperature, but lower than those of the first, second and fourth magnetic layers 121, 122, and 124. The fourth magnetic layer 124 is formed as a recording layer.

More specifically, each of the above-described first to fourth magnetic layers 121 to 124 is made, roughly similar to the first to third magnetic layers 111 to 113 of the magneto-optical recoding medium 110, of a rare earth-iron family metal amorphous alloy containing 10 to 40 at. % of one or more types of rare earth metal elements such as Pr, Nd, Sm, Eu, Gd, Tb, Dy, Ho, and Er, and 60 to 90 at. % of one or more types of iron family elements such as Fe, Co, and Ni. It is also described that, to increase a corrosion resistance, a small amount of elements such as Cr, Mn, Cu, Ti, Al, Si, Pt, and In may be added to such an alloy. Furthermore, it is described that a platinum family metal-iron family metal periodic structure film such as Pt/C, Pd/Co or the like, a platinum family metal-iron family metal alloy film, an antiferromagnetic material such as Co—Ni—O or Fe—Rh based alloy, and a material such as magnetic garnet can be used.

In the magneto-optical recording medium 120 constituted in the foregoing manner, by laser beam irradiation from the first magnetic layer 121 side during recording, an information signal is recorded in the fourth magnetic layer 124 by a not-shown magnetic head to be saved as a magnetic domain of an arrow direction. Furthermore, after the recording, and during non-irradiation with a laser beam, the magnetic domain recorded in the fourth magnetic layer 124 is exchange-coupled to the first magnetic layer 121 through the second and third magnetic layers 122 and 123. In this case, vertical arrows AS in the first to fourth magnetic layers 121 to 124 indicate directions of atomic spins. On a boundary of areas where directions of spins are opposite to each other, a magnetic domain wall DW is formed.

Here, if the first magnetic layer 121 is irradiated with a laser beam during reproducing, a medium temperature reaches Curie temperature Ts or higher of the third magnetic layer 123 between shown positions X1 and X2 with respect to the laser beam. Correspondingly, in an area between the positions X1 and X2, because a temperature of the third magnetic layer 123 is, raised to Curie temperature Ts or higher, magnetization thereof is lost to cut off the exchange coupling between the first and second magnetic layers 121 and 122, and the fourth magnetic layer 124. This area is referred to as a decoupling area.

Then, when the magnetic domain wall DW existing in the first and second magnetic layers 121 and 122 enters the decoupling area, this magnetic domain wall DW is moved toward a temperature peak in the first and second magnetic layers 121 and 122 as indicated by an arrow to generate magnetic domain wall movement DWM. Following this magnetic domain wall movement DWM, the magnetic domain exchange-coupled in the first magnetic layer 121 is enlarged by a reproducing laser beam to be read out. On the other hand, since a coercive force (magnetic domain wall coercive force) of the fourth magnetic layer 124 which becomes a recording layer is sufficiently large, the magnetic domain wall therein is not moved, and a recording state is maintained. Thus, the very small magnetic domain in which reproducing is impossible by normal reproducing resolution is enlarged to execute reproducing, whereby a recording density can be greatly increased.

In the Japanese Patent Laid-Open No. 2000-187898, it is described that the magnetic domain wall movement DWM occurs in the first and second magnetic layers 121 and 122. Generally, however, since the second magnetic layer 122 is formed very thin, whether the second magnetic layer 122 functions as a magnetic domain wall displacement layer or as a layer for controlling exchange coupling is not exactly known. Therefore, it may be considered that, during reproducing, a temperature is raised to lose at least magnetization of the third magnetic layer 123 by laser beam irradiation, and magnetic domain wall movement is generated so as to enlarge the magnetic domain exchange-coupled in the first magnetic layer 121.

Incidentally, in each of the conventional magneto-optical recording medial 110 and 120 respectively shown in FIG. 1 and FIG. 2, the magnetic domain enlargement reproducing technology by the magnetic domain wall movement DWM is effective for realizing a high-density recording medium, but there is a shift of a reproduced signal on a time axis, i.e., a problem of deteriorated jitter characteristics, which is intrinsic to the magnetic domain wall movement reproducing. To improve the jitter characteristics, a start timing of the magnetic domain wall movement DWM must be set sharp, and time until completion of the magnetic domain wall movement DWM must be shortened.

However, in each film composition of the first to third magnetic layers 111 to 113 and the first-to fourth magnetic layers 121 to 124 of the conventional magneto-optical recording media 110 and 120, as described above, each of all the magnetic layers only contains 10 to 40 at. % of one or more types of rare earth metal elements, and 90 to 60 at. % of one or more types of iron family elements such as Fe, Co, and Ni. Based on this, samples were prepared to try an experiment. However, this composition did not lead to any improvements of jitter characteristics during reproducing.

SUMMARY OF THE INVENTION

An object of the present invention is to provide, regarding a magneto-optical recording medium of a 3 magnetic layer structure, and a magneto-optical recording medium of a 4 magnetic layer structure, a high-density magneto-optical recording medium especially capable of clarifying a characteristic change by exchange interaction between a first layer to become a magnetic domain wall displacement layer and a third or fourth magnetic layer to become a recording layer with respect to a composition change of each layer, improving a jitter characteristic more which is one of reproduced signal characteristics in a magnetic domain (recording mark) smaller than 0.1 µm by making strict combination of composition ranges, improving the jitter characteristic more by reducing a stray field leaked from the third or fourth magnetic layer to become a recording layer to the first magnetic layer to become a magnetic domain wall displacement layer in a temperature area for executing reproducing by magnetic domain wall movement, and simultaneously enhancing recoding magnetic field sensitivity.

In order to achieve the foregoing object, there is provided a magneto-optical recording medium comprising: a first magnetic layer; a second magnetic layer; and a third magnetic layer, the first to third magnetic layers being sequentially formed from a side irradiated with a laser beam, an information signal during recording being recorded in a form of a magnetic domain in the third magnetic layer having a magnetization easy axis in a vertical direction by an external magnetic field while the irradiation with the laser beam is executed, then the magnetic domain being switched through the second magnetic layer to be connected to the first magnetic layer and, magnetization of the second magnetic layer being lost by a temperature raised by the irradiation with the laser beam during reproducing, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/lower than 1, the second magnetic layer is formed by using a material with a base of a Tb—Fe film or a Dy—Fe film, and adding a nonmagnetic element such as Al or Cr, and Co, the third magnetic layer is formed by using a material with a base of a Tb—Fe—Co film or a Dy—Fe—Co film, an element concentration ratio (at. % ratio) of Tb or Dy to Fe—Co is set in a range of 24.5≦Tb≦26.5 or 26≦Dy≦29.5, and addition amounts of Co and a nonmagnetic element to each magnetic layer are adjusted to set Curie temperatures Tc11, Tc12, and Tc13 of the first, second and third magnetic layers to Tc13>Tc11>Tc12, whereby a stray field from the third magnetic layer to the first magnetic layer is reduced in a temperature range where a reproduction is carried out by the magnetic domain wall displacement.

According to the present invention, in the magneto-optical recording medium, when the magnetic layers are laminated to form a three-layer structure, especially the first magnetic layer which becomes a magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/Lower than 1, the third magnetic layer which becomes a recording layer is formed by using the material with a base of the Tb—Fe—Co film or the Dy—Fe—Co film, the element concentration ratio (at. % ratio) of Tb or Dy to Fe—Co is set in the range of 24.5≦Tb≦26.5 or 26.5≦Dy≦29.5, and Curie temperatures Tc11, Tc12, and Tc13 of the first, second and third magnetic layers are set to Tc13>Tc11>Tc12, whereby a stray field from the third magnetic layer to the first magnetic layer is reduced in a temperature range where a reproduction is carried out by the magnetic domain wall displacement. Thus, magnetic domain wall movement generated in the first magnetic layer is made faster when irradiation with a laser beam is executed during reproducing, which enables great improvement of a jitter characteristic which is one of reproduced signal characteristics. Therefore, it is possible to provide a higher-density magneto-optical recording medium.

In order to achieve the foregoing object, there is provided a magneto-optical recording medium comprising: a first magnetic layer; a second magnetic layer; a third magnetic layer; and a fourth magnetic layer, the first to fourth magnetic layers being sequentially formed from a side irradiated with a laser beam, an information signal during recording being recorded in a form of a magnetic domain in the fourth magnetic layer having a magnetization easy axis in a vertical direction by an external magnetic field while the irradiation with the laser beam is executed, then the magnetic domain being exchanged through the second and third magnetic layers to be connected to the first magnetic layer and, during reproducing, magnetization of the third magnetic layer being lost by a temperature raised by the irradiation with the laser beam, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/lower than 1, each of the second and third magnetic layers is formed by using a material with a base of a Tb—Fe film or a Dy—Fe film, and adding a nonmagnetic element such as Al or Cr, and Co, the fourth magnetic layer is formed by using a material with a base of a Tb—Fe—Co film or a Dy—Fe—Co film, an element concentration ratio (at. % ratio) of Tb or Dy to Fe—Co is set in a range of 24.5≦Tb≦26.5 or 26.5≦Dy≦29.5, and addition amounts of Co and a nonmagnetic element to each magnetic layer are adjusted to set Curie temperatures Tc21, Tc22, Tc23 and Tc24 of the first, second, third and fourth magnetic layers to Tc24>Tc21>Tc22>Tc23, whereby a stray field from the fourth magnetic layer to the first magnetic layer is reduced in a temperature range where a reproduction is carried out by the magnetic domain wall displacement.

According to the present invention, when the magnetic layers are laminated to form a 4-layer structure, especially the first magnetic layer which becomes a magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/lower than 1, the fourth magnetic layer which becomes a recording layer is formed by using the material with a base of the Tb—Fe—Co film or the Dy—Fe—Co film, the element concentration ratio (at. % ratio) of Tb or Dy to Fe—Co is set in a range of 24.5≦Tb≦26.5 or 26.5≦Dy≦29.5, and Curie temperatures Tc21, Tc22, Tc23 and Tc24 of the first, second, third and fourth magnetic layers are set to Tc24>Tc21>Tc22>Tc23, whereby a stray field from the fourth magnetic layer to the first magnetic layer is reduced in a temperature range where a reproduction is carried out by the magnetic domain wall displacement. Thus, only magnetic domain wall displacement from the front of the movement direction of the laser beam in a temperature area in which the magnetic domain wall can be moved in the first magnetic layer is made faster when irradiation with a laser beam is executed during reproducing, which enables great improvement of a jitter characteristic which is one of reproduced signal characteristics. Therefore, it is possible to provide a much higher density magneto-optical recording medium.

In order to achieve the foregoing object, there is provided a magneto-optical recording medium comprising: a first magnetic layer; a second magnetic layer; and a third magnetic layer, the first to third magnetic layers being sequentially formed from a side irradiated with a laser beam, an information signal during recording being recorded in a form of a magnetic domain in the third magnetic layer having a magnetization easy axis in a vertical direction by an external magnetic field while the irradiation with the laser beam is executed, then the magnetic domain being exchanged through the second magnetic layer to be connected to the first magnetic layer and, during reproducing, magnetization of the second magnetic layer being lost by a temperature raised by the irradiation with the laser beam, and magnetic domain wall movement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/lower than 1, the second magnetic layer is formed by using a material with a base of a Tb—Fe film or a Dy—Fe film, and adding a nonmagnetic element such as Al or Cr, and Co, the third magnetic layer is made of two films, i.e., a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first magnetic layer.

According to the present invention, when the magnetic layers are laminated to form a 3-layer structure, especially the first magnetic layer which becomes a-magnetic domain wall displacement layer is formed by using the material with a base of the Gd—Fe film or the Gd—Fe—Co film in order to set a normalized magnetic field obtained by normalizing a magnetic domain wall driving field based on saturation magnetization equal to/lower than 1, the third magnetic layer is made of two films, i.e., the Tb—Fe—Co film and the Gd—Fe—Co film, and the anti-parallel coupling is maintained which becomes stable when the directions of magnetizations of the two films are opposite to each other in the temperature area in which reproducing is executed by the magnetic domain wall displacement in the first magnetic layer. Thus, stray field leaked from the third magnetic layer which becomes a recording layer to the first magnetic layer which becomes a magnetic domain wall displacement layer is reduced to enable further improvement of a jitter characteristic which is one of reproduced signal characteristics, and simultaneous enhancement of recording magnetic field sensitivity. Therefore, it is possible to provide a much higher density magneto-optical recording medium.

In order to achieve the foregoing object, there is provided a magneto-optical recording medium comprising: a first magnetic layer; a second magnetic layer; a third magnetic layer; and a fourth magnetic layer, the first to fourth magnetic layers being sequentially formed from a side irradiated with a laser bean, an information signal during recording being recorded in a form of a magnetic domain in the fourth magnetic layer having a magnetization easy axis in a vertical direction by an external magnetic field while the irradiation with the laser beam is executed, then the magnetic domain being switched through the second and third magnetic layers to be connected to the first magnetic layer and, magnetization of the third magnetic layer during reproducing being lost by a temperature raised by the irradiation with the laser beam, and magnetic domain wall displacement being generated to enlarge the magnetic domain formed by the exchange coupling in the first magnetic layer, wherein the first magnetic layer is formed by using a material with a base of a Gd—Fe film or a Gd—Fe—Co film in order to set a normalized magnetic field obtained by normalizing a magnetic domain wall driving field based on saturation magnetization equal to/lower than 1, each of the second and third magnetic layers is formed by using a material with a base of a Tb—Fe film or a Dy—Fe film, and adding a nonmagnetic element such as Al or Cr, and Co, the fourth magnetic layer is made of two films, i.e., a Tb—Fe—Co film and a Gd—Fe—Co film, and anti-parallel coupling is a maintained which becomes stable when directions of magnetizations of the two films are opposite to each other in a temperature area in which reproducing is executed by magnetic domain wall movement in the first layer.

According to the present invention, when the magnetic layers are laminated to form a 4-layer structure, especially the first magnetic layer which becomes a magnetic domain wall displacement layer, is formed by using the material with a base of the Gd—Fe film or the Gd—Fe—Co film in order to set a normalized magnetic field obtained by normalizing a magnetic domain wall driving field based on saturation magnetization equal to/lower than 1, the fourth magnetic layer which becomes a recording layer is made of two films, i.e., the Tb—Fe—Co film and the Gd—Fe—Co film, and the anti-parallel coupling is maintained which becomes stable when the directions of magnetizations of the two films are opposite to each other in the temperature area in which reproducing is executed by the magnetic domain wall displacement in the first layer. Thus, stray field leaked from the fourth magnetic layer which becomes a recording layer to the first magnetic domain wall layer which becomes a magnetic domain wall displacement layer is reduced to enable further improvement of a jitter characteristic which is one of reproduced signal characteristics, and for simultaneous enhancement of recording magnetic field sensitivity. Therefore, it is possible to provide a much higher density magneto-optical recording medium.

The nature, principle and utility of the invention will become more apparent from the following detailed description when read in conjunction with the accompanying drawings.

BRIEF DESCRIPTION OF THE DRAWINGS

In the accompanying drawings:

FIG. 9 is a view showing a change of a stray field when an element concentration ratio of heavy rare earth (Tb) to iron family metal (Fe—Co) contained in a third magnetic layer 15 or a fourth magnetic layer 26 is 27.5 at. % in the magneto-optical recording medium of each of the first and second embodiments of the invention;

FIG. 10 is a vies similarly showing a change of the stray field when an element concentration ratio is 26.5 at. %;

DESCRIPTION OF THE PREFERRED EMBODIMENTS

Next, detailed description will be made of the preferred embodiments of magneto-optical recording media of the present invention with reference to FIGS. 3 to 21.

Figure 3:
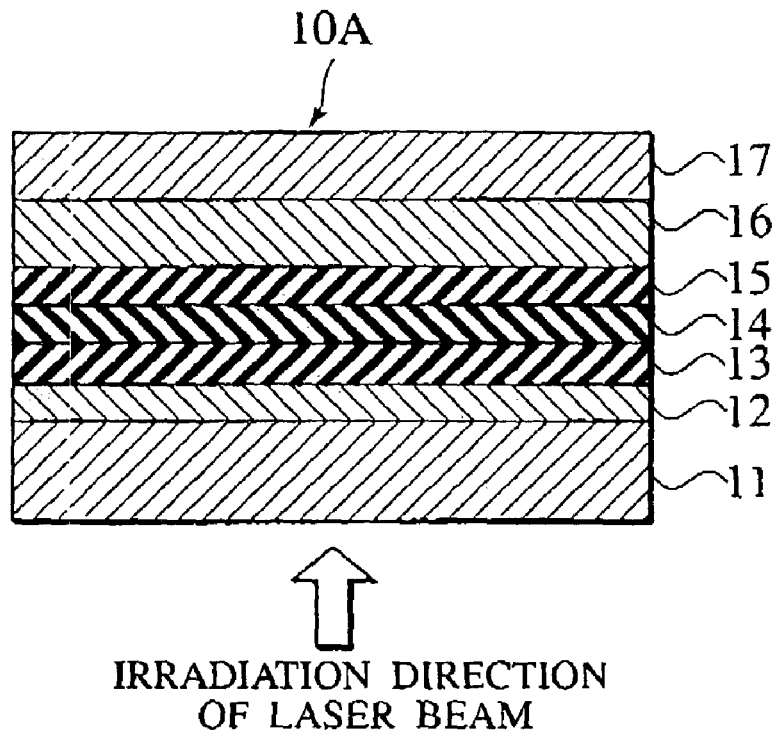
FIG. 3 is a sectional view schematically showing layer formation of a magneto-optical recording medium according to a first embodiment of the present invention.
Figure 4:
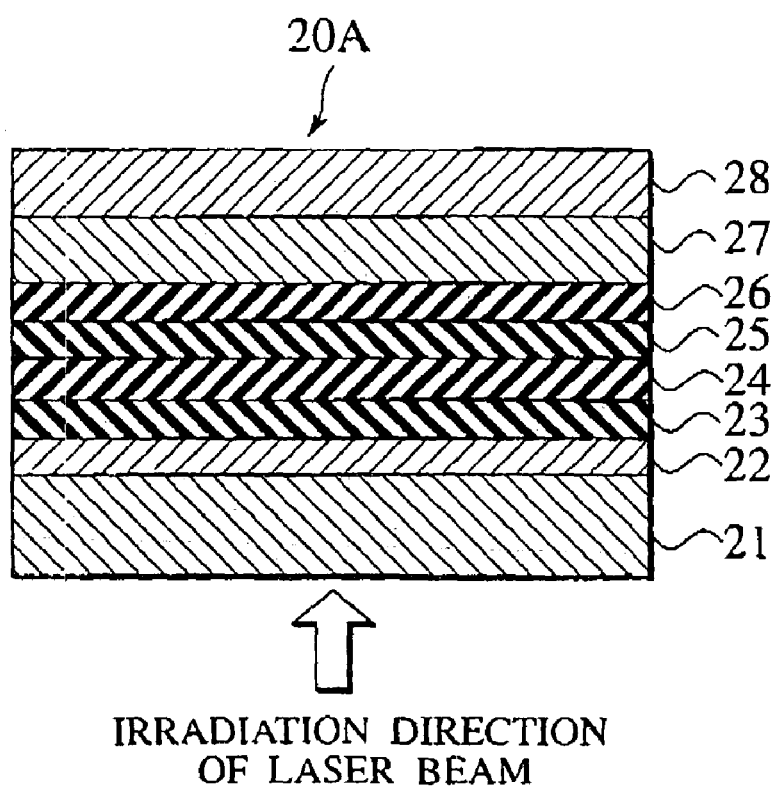
FIG. 4 is a sectional view schematically showing layer formation of a magneto-optical recording medium according to a second embodiment of the present invention.

First, layer formations of magneto-optical recording media of first and second embodiments of the present invention are described by referring to FIGS. 3 and 4.

FIG. 3 is a sectional view schematically showing layer formation of the magneto-optical recording medium of the first embodiment of the invention, and FIG. 4 is a sectional view schematically showing layer formation of the magneto-optical recording medium of the second embodiment of the invention.

<First Embodiment>

As shown in FIG. 3, as in the case of the magneto-optical recording medium 110 (FIG. 1) of the example described above in the section of the related art, a magneto-optical recording medium 10A of the first embodiment of the present invention is constituted of a 3 magnetic layer structure to generate magnetic domain wall movement similarly to the conventional magneto-optical recording medium 110. However, in the magneto-optical recording medium 10A of the first embodiment of the invention, a magnetic characteristic and a composition of each magnetic layer is made stricter than that of the conventional magneto-optical recording medium 110, thereby improving such that magnetic domain wall movement is made faster and a stray field from the third magnetic layer which becomes a recording layer to the first magnetic layer which becomes a magnetic domain wall displacement layer is reduced.

Thus, as in the case of the foregoing conventional magneto-optical recording medium 110 (FIG. 1), the magneto-optical recording medium 10A of the first embodiment of the invention, first, second and third magnetic layers 13, 14 and 15 are sequentially formed from a side irradiated with a laser beam, an information signal is recorded in a form of a magnetic domain ins the third magnetic layer 15 having a magnetization easy axis in a vertical direction by an external magnetic field while executing the irradiation with the laser beam during recording, and then the magnetic domain is exchange-coupled to the first magnetic layer 13 through the second magnetic layer 14. During reproducing, because a temperature is raised by the irradiation with the laser beam, magnetization of the second magnetic layer 14 is lost to generate magnetic domain wall movement in such a way as to enlarge the magnetic domain exchange-coupled in the first magnetic layer 13.

That is, the magneto-optical recording medium 10A of the first embodiment of the invention has an outer shape formed as an optical disk having a circular shape or an optical card having a card shape, and is constituted to enable super high-density recording/reproducing of an information signal.

In the above-described magneto-optical recording medium 10A of the first embodiment, on a light transmissible substrate 11 formed by using a transparent glass plate, transparent polycarbonate or the like, the first, second and third magnetic layers 13, 14 and 15 are sequentially laminated with a transparent first dielectric layer 12 therebetween which becomes a protective film or a multiple interference layer, for example by continuous sputtering or the like in vacuum, to form a 3 magnetic layer structure. Further, on the third magnetic layer 15, a second dielectric layer 16 made of a nonmagnetic metal film or a dielectric film is formed and, on this second dielectric layer 16, a protective layer 17 made of a UV cured resin or the like is formed when necessary. In this case, irradiation of the magneto-optical recording medium 10A of the first embodiment with a laser beam is executed from the light transmissible substrate 11 side toward the first to third magnetic layers 13 to 15.

Here, in the magneto-optical recording medium 10A of the first embodiment, among the first to third magnetic layers 13 to 15 of the 3-layer structure, the first magnetic layer 13 which becomes a side to be irradiated with the laser beam is a film of small magnetic anisotropy to facilitate movement of a magnetic domain wall by a temperature gradient made by the irradiation with the laser beam, and functions as a magnetic domain wall displacement layer.

The first magnetic layer 13 is formed as an amorphous thin film made of heavy rare earth and iron family metal which becomes a film having an easy magnetization direction in a vertical direction (direction vertical to a film surface), i.e., a so-called perpendicular magnetization film, and a material with a base of a Gd—Fe film or a Gd—Fe—Co film is used. Here, by controlling the composition of the first magnetic layer 13 to adjust the magnetic characteristic in a temperature range where a magnetic domain wall movement is realized, the film is formed to be treated when a magnetic domain wall displacement operation in the first magnetic layer 13 is equal to or less than Walker breakdown field as described later. In other words, the film is formed so that a normalized magnetic field obtained by normalizing a magnetic domain wall driving field based on saturation magnetization may be less than 1. In this case, an addition amount of Co in the first magnetic layer 13 is adjusted and, further, by adding a nonmagnetic element such as Al or Cr, Curie temperature Tc11 of the first magnetic layer 13 is adjusted.

Incidentally, upon adjusting the magnetic characteristic in a temperature range where a magnetic domain wall movement is realized, it is fruitful to add an element having such effect as to reduce an exchange energy between rare earth (Gd) and iron family (Fe, Co), and Bi and Sn are available as such element to be added.

The second magnetic layer 14 functions as a film for controlling an exchange coupling force when the magnetic domain (recording mark) is transferred from the third magnetic layer 15 to the first magnetic layer 13. This second magnetic layer 14 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe film or a Dy—Fe film is used, and the film is formed by adding a nonmagnetic element such as Al or Cr and Co to adjust Curie temperature Tc12 of the second magnetic layer 14.

The third magnetic layer 15 needs to be a film having a coercive force enough to stably hold a magnetic domain recorded at room temperature, after an information signal is recorded in the form of the magnetic domain (magnetization reversal area) in a film surface having a magnetization easy axis in a vertical direction by an external magnetic field of a not shown magnetic head or the like while irradiation with a laser beam is executed, and having Curie temperature Tc13 suitable for information signal recording, and functions as a recording layer (memory layer).

This third magnetic layer 15 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe—Co film or a Dy—Fe—Co film is used, a nonmagnetic element such as Al or Cr is added to adjust Curie temperature Tc13 of the third magnetic layer 15, and an element concentration ratio (at % ratio) of heavy rare earth (Tb or Dy) to iron family metal (Fe—Co) in the third magnetic layer 15 is set in a range of $24.5 \leq Tb \leq 26.5$ or $26.5 \leq Dy \leq 29.5$. The range of this element concentration ratio will be described later.

For the magneto-optical recording medium 10A of the first embodiment constituted-in the foregoing manner, considering a raised temperature state by the laser beam during recording and reproducing, preferably, Curie temperatures Tc11, Tc12, and Tc13 of the first to third magnetic layers 13, 14 and 15 are respectively set near about 530K, about 420K, and about 590K. Here, each of Curie temperatures Tc11, Tc12, and Tc13 of the first to third magnetic layers 13, 14, and 15 can be raised by increasing the addition amount of Co in each magnetic layer. On the other hand, each Curie temperature can be reduced by increasing the addition amount of the nonmagnetic element such as Al or Cr which does not change magnetic properties of each magnetic layer greatly. Accordingly, the addition amount of Co or the nonmagnetic element of each magnetic layer is adjusted to set Curie temperatures Tc11, Tc12, and Tc13 to Tc13>Tc11>Tc12.

Furthermore, preferably, film thicknesses t11, t12, and t13 of the first to third magnetic layers 13, 14, and 15 are respectively set near about 30 nm, about 10 nm, and about 60 to 80 nm.

<Second Embodiment>

As shown in FIG. 4, as in the case of the magneto-optical recording medium 120 (FIG. 2) of the other example described above in the section of the related art, a magneto-optical recording medium 20A of the second embodiment of the present invention is constituted of a 4 magnetic layer structure to generate magnetic domain wall movement from a front side of a laser beam displacement direction of a temperature elevated area (about 430K to about 490K) which enables magnetic domain wall movement by laser beam irradiation similarly to the conventional magneto-optical recording medium 120. However, in the magneto-optical recording medium 20A of the second embodiment of the invention, a magnetic characteristic and a composition of each magnetic layer is made stricter than that of the conventional magneto-optical recording medium 120, thereby improving such that magnetic domain wall movement is made faster and a stray field from the fourth magnetic layer which becomes a recording layer to the first magnetic layer which becomes a magnetic domain wall displacement layer is reduced.

Thus, as in the case of the foregoing conventional magneto-optical recording medium 120 (FIG. 2), the magneto-optical recording medium 20A of the second embodiment of the invention, first, second, third and fourth magnetic layers 23, 24, 25 and 26 are sequentially formed from a side irradiated with a laser beam, an information signal is recorded in a form of a magnetic domain in the fourth magnetic layer 26 having a magnetization easy axis in a vertical direction by an external magnetic field while executing the irradiation with the laser beam during recording, and then the magnetic domain is exchange-coupled to the first magnetic layer 23 through the second and third magnetic layers 24 and 25. During reproducing, because a temperature is raised by their radiation with the laser beam, at least magnetization of the third magnetic layer 25 is lost to generate magnetic domain wall movement in such a way as to enlarge the magnetic domain exchange-coupled in the first magnetic layer 23.

That is, the magneto-optical recording medium 20A of the second embodiment of the invention has an outer shape formed as an optical disk having a circular shape or an optical card having a card shape, and is constituted to enable super high-density recording/reproducing of an information signal.

In the above-described magneto-optical recording medium 20A of the second embodiment, on a light transmissible substrate 21 formed by using a transparent glass plate, transparent polycarbonate or the like, the first, second, third and fourth magnetic layers 23, 24, 25 and 26 are sequentially laminated with a transparent first dielectric layer 22 therebetween which becomes a protective film or a multiple interference layer, for example by continuous sputtering or the like in vacuum, to form a 4 magnetic layer structure. Furthermore, on the fourth magnetic layer 26, a second dielectric layer 27 made of a nonmagnetic metal film or a dielectric film is formed and, on this second dielectric layer 27, a protective layer 28 made of a UV cured resin or the like is formed when necessary. In this case, irradiation of the magneto-optical recording medium 20A of the second embodiment with a laser beam is executed from the light transmissible substrate 21 side toward the first to fourth magnetic layers 23 to 26.

Here, in the magneto-optical recording medium 20A of the second embodiment, among the first to fourth magnetic layers 23 to 26 of the 4-layer structure, the first magnetic layer 23 which becomes a side to be irradiated with the laser beam is, as in the case of the first magnetic layer 13 formed In the foregoing magneto-optical recording medium 10A of the first embodiment, with a film of small magnetic anisotropy to facilitate movement of a magnetic domain wall by a temperature gradient made by the irradiation with the laser beam, and functions as a magnetic domain wall displacement layer.

The first magnetic layer 23 is formed as an amorphous thin film made of heavy rare earth and iron family metal which becomes a film having an easy magnetization direction in a vertical direction (direction vertical to a film surface), i.e., a so-called perpendicular magnetization film, and a material with a base of a Gd—Fe film or a Gd—Fe—Co film is used. Here, by controlling the composition of the first magnetic layer 23 to adjust the magnetic characteristic in a temperature range where a magnetic domain wall movement is realized, the film is formed to be treated when a magnetic domain wall displacement operation in the first magnetic layer 23 is equal to or less than Walker breakdown field as described later. In other words, the film is formed so that a normalized magnetic field obtained by normalizing a magnetic domain wall driving field based on saturation magnetization may be less than 1. In this case, an addition amount of Co in the first magnetic layer 23 is adjusted and, further, by adding a nonmagnetic element such as Al or Cr, Curie temperature Tc21 of the first magnetic layer 23 is adjusted.

Incidentally, upon adjusting the magnetic characteristic in a temperature range where a magnetic domain wall movement is realized, it is fruitful to add an element having such effect as to reduce an exchange energy between rare earth (Gd) and Iron family (Fe, Co), and Bi and Sn are available as such element to be added.

The second and third magnetic layers 24 and 25 are formed to be a double layer different from the second magnetic layer 14 formed in the foregoing magneto-optical recording medium 10A of the first embodiment. Of the second and third magnetic layers 24 and 25, the second magnetic layer 24 is formed to be very thin, whereby the second magnetic layer 24 is provided with a function of generating only magnetic domain wall movement from the front of a displacement direction of the laser beam in a temperature elevated area (about 430K to about 490K) which enables magnetic domain wall movement.

Of the second and third magnetic layers 24 and 25, at least the third magnetic layer 25 functions, if a later-described magnetic domain recorded in the fourth magnetic layer 26 is exchange-coupled to the first magnetic layer 23 through the second and third magnetic layers 24 and 25, as a film whose magnetization is lost because of a temperature raised by laser beam irradiation during reproducing. Each of these second and third magnetic layers 24 and 25 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe film or a Dy—Fe film is used, and the film is formed by adding a nonmagnetic element such as Al or Cr, and Co to adjust Curie temperatures Tc22 and Tc23 of the second and third magnetic layers 24 and 25.

As in the case of the third magnetic layer 15 formed in the foregoing magneto-optical recording medium 10A of the first embodiment, the fourth magnetic layer 26 needs to be a film having a coercive force enough to stably hold a magnetic domain recorded at room temperature after an information signal is recorded in the form of the magnetic domain (magnetization reversal area) in a film surface having a magnetization easy axis in a vertical direction by an external magnetic field of a not-shown magnetic head or the like while irradiation with a laser beam is executed during recording, and Curie temperature Tc24 suitable for information signal recording, and functions as a recording layer (memory layer)

This fourth magnetic layer 26 is also formed as an amorphous thin film made of heavy rare earth and iron family metal which becomes a film having an easy magnetization direction in a vertical direction (direction vertical to a film surface), i.e., a so-called perpendicular magnetization film. A material with a base of a Tb—Fe—Co film or a Dy—Fe—Co film is used, a nonmagnetic element such as Al or Cr is added to adjust Curie temperature Tc24 of the fourth magnetic layer 26, and an element concentration ratio (at. % ratio) of heavy rare earth (Tb or Dy) to iron family metal (Fe—Co) in the fourth magnetic, layer 26 is set in a range of $24.5 \leq Tb \leq 26.5$ or $26.5 \leq Dy \leq 29.5$. The range of this element concentration ratio will be described later.

For the magneto-optical recording medium 20A of the second embodiment constituted in the foregoing manner, considering a raised temperature state by the laser beam during recording and reproducing, preferably, Curie temperatures Tc21, Tc22, Tc23 and Tc24 of the first to fourth magnetic layers 23, 24, 25 and 26 are respectively set near about 530K, about 430K, about 420K, and about 590K. Here, each of Curie temperatures Tc21, Tc22, Tc23, and Tc24 of the first to fourth magnetic layers 23, 24, 25, and 26 can be raised by increasing the addition amount of Co in each magnetic layer. On the other hand, each Curie temperature can be reduced by increasing the addition amount of the nonmagnetic element such as Al or Cr which does not change magnetic properties of each layer greatly. Accordingly, the addition amount of Co or the nonmagnetic element of each magnetic layer is adjusted to set Curie temperatures Tc21, Tc22, Tc23, and Tc24 to Tc24>Tc21>Tc22>Tc23.

Furthermore, preferably, film thicknesses t21, t22, t23 and t24 of the first to fourth magnetic layers 23, 24 25, and 26 are respectively set near about 30 nm, about 5 to 15 nm; about 10 nm, and about 60 to 80 nm.

Now, detailed description will be made of magnetic domain wall movement of the first magnetic layer 13 or 23 in the magneto-optical recording medium 10A or 20A of the first or second embodiment of the invention.

Figure 5A:
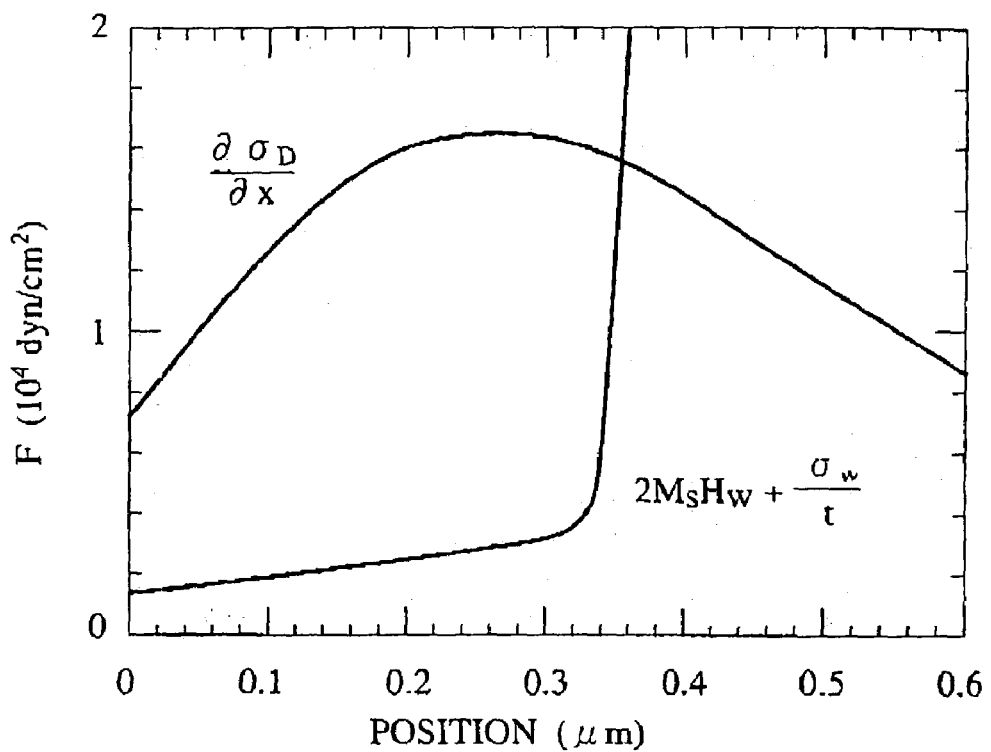
FIG. 5A is a view for explaining magnetic domain wall movement of a first magnetic layer (magnetic domain wall displacement layer) in the conventional magneto-optical recording medium.

FIG. 5A is a view for explaining magnetic domain wall movement of a first magnetic layer (magnetic domain wall displacement layer) in the conventional magneto-optical recording medium.

Figure 5B:
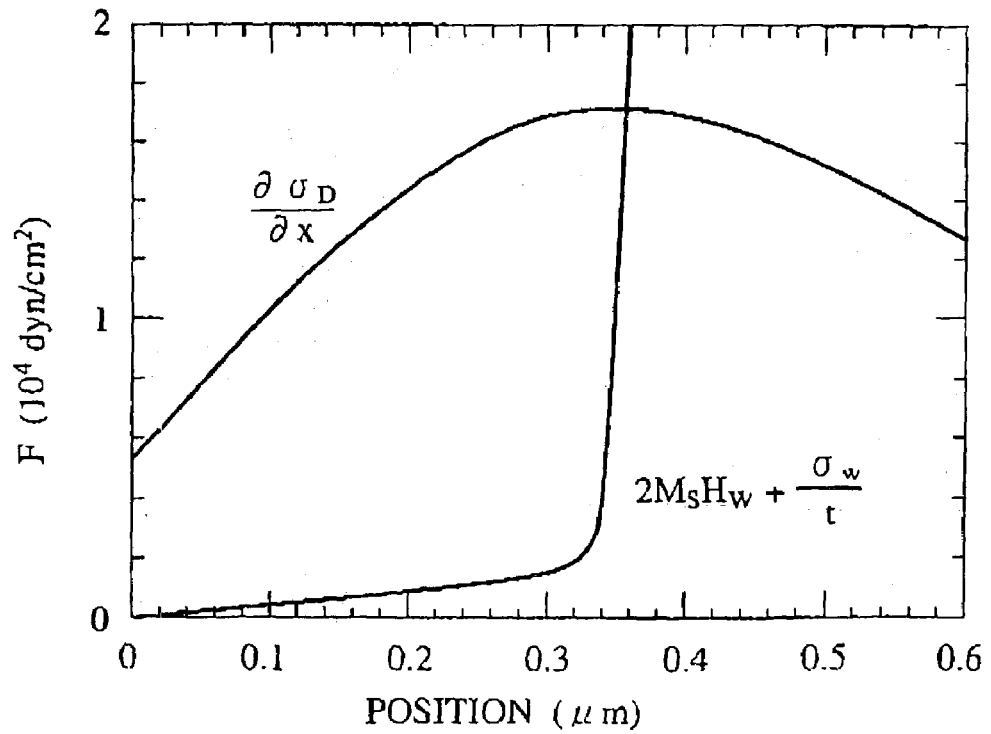
FIG. 5B is a view for explaining magnetic domain wall movement of the first magnetic layer (magnetic domain wall displacement layer) in the magneto-optical recording medium of each of the first and second embodiments of the invention.

FIG. 5B is a view for explaining magnetic domain wall movement of the first magnetic layer (magnetic domain wall displacement layer) in the magneto-optical recording medium of each of the first and second embodiments of the invention.

Figure 6:
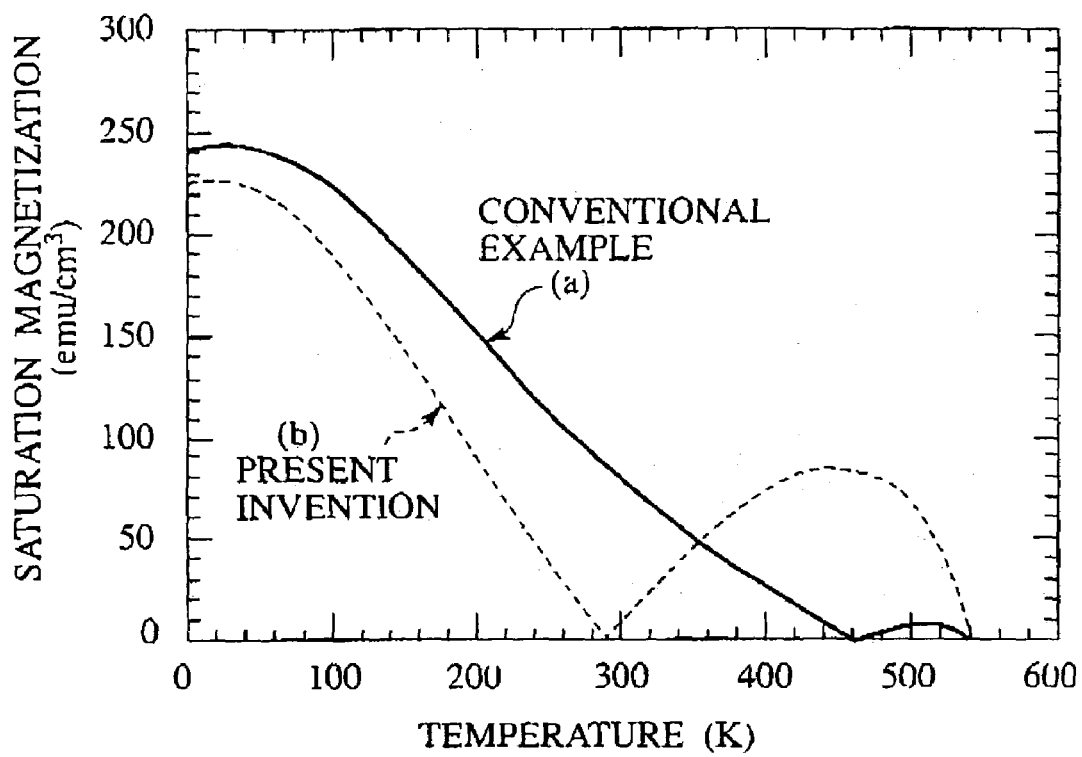
FIG. 6 is a view showing magnetization characteristics of the first magnetic layer (magnetic domain wall displacement layer) with respect to temperature.

FIG. 6 is a view showing magnetization characteristics of the first magnetic layer (magnetic domain wall displacement layer) with respect to temperature, in which (a) shows in a case of the conventional magneto-optical recording medium and (b) shows in cases of the magneto-optical recording medium of each of the first and second embodiments of the invention.

Figure 7:
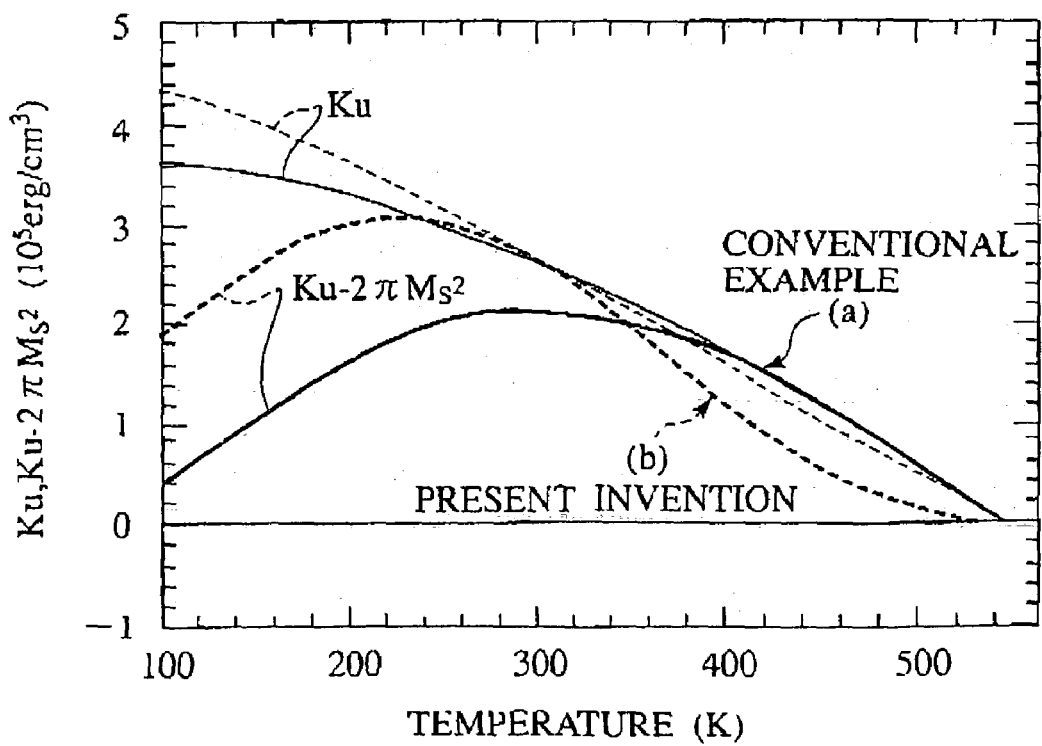
FIG. 7 is a view showing magnetic anisotropy characteristics of the first magnetic layer (magnetic domain wall displacement layer) with respect to temperature.

FIG. 7 is a view showing magnetic anisotropy characteristics of the first magnetic layer (magnetic domain wall displacement layer) with respect to temperature, in which (a) shows in a case of the conventional magneto-optical recording medium and (b) shows in cases of the magneto-optical recording medium of each of the first and second embodiments of the invention.

Figure 8A:
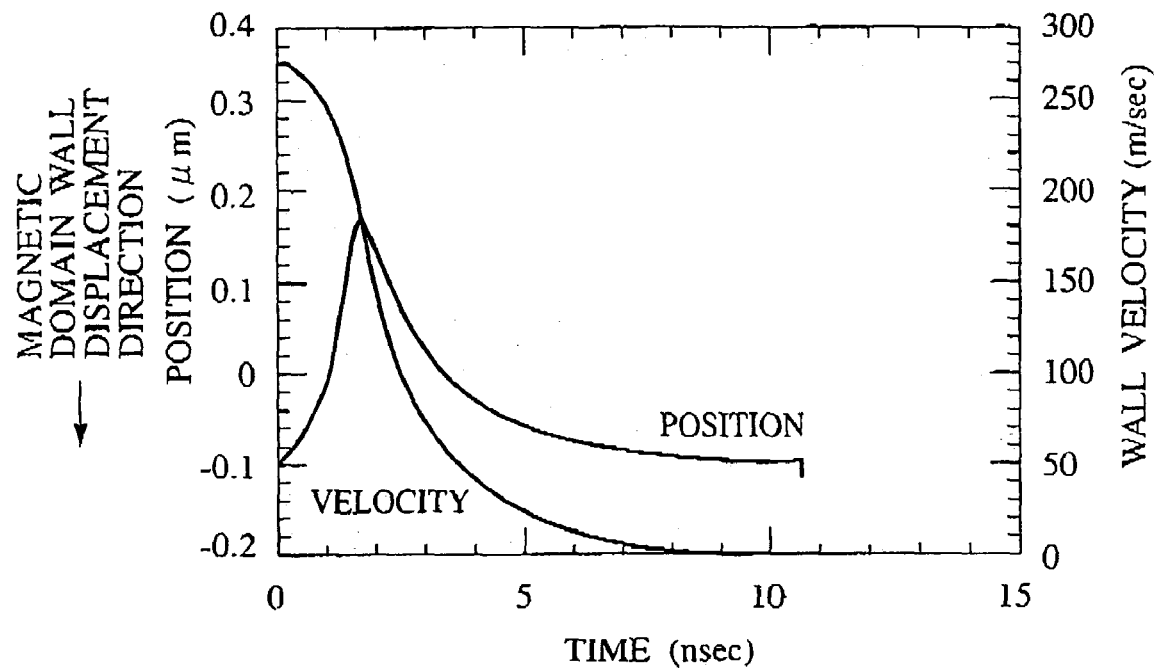
FIG. 8A is a plot of changes of a displacement velocity and a position of the magnetic domain wall in the first magnetic layer (magnetic domain wall displacement layer) with respect to time in the conventional magneto-optical recoding medium.

FIG. 8A is a plot of changes of a displacement velocity and a position of the magnetic domain wall in the first magnetic layer (magnetic domain wall displacement layer) with respect to time in the conventional magneto-optical recoding medium.

Figure 8B:
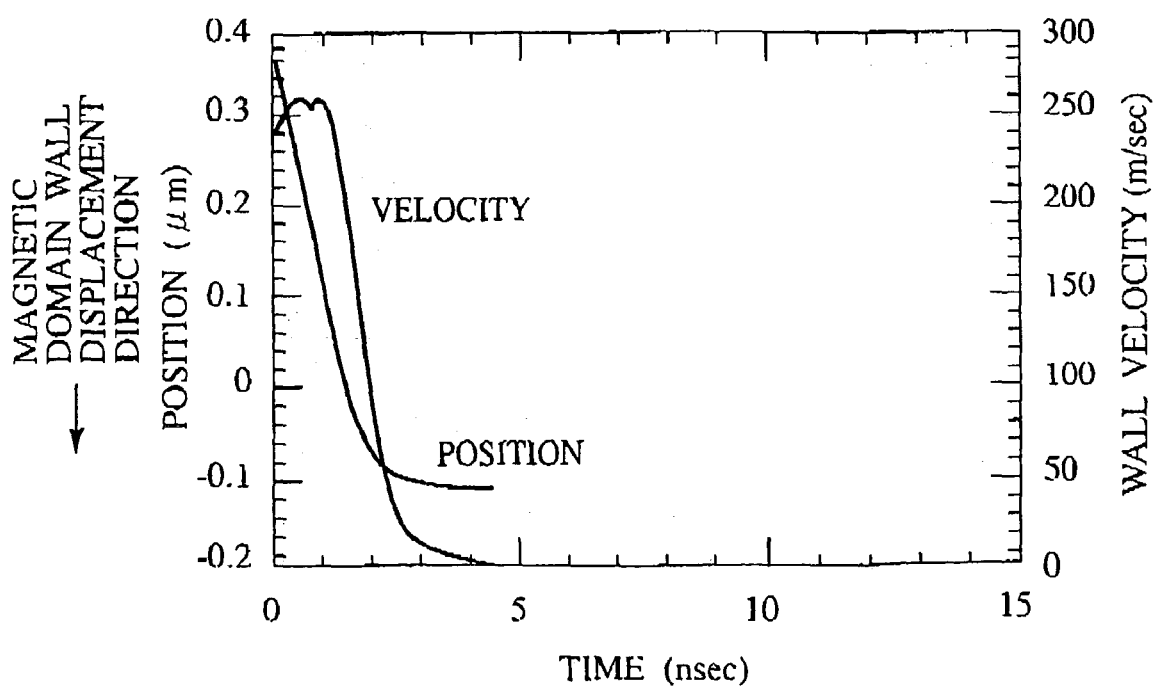
FIG. 8B is a plot of changes of a displacement velocity and a position of the magnetic domain wall in the first magnetic layer (magnetic domain wall displacement layer) with respect to time in the magneto-optical recoding medium of each of the first and second embodiments of the invention.

FIG. 8B is a plot of changes of a displacement velocity and a position of the magnetic domain wall in the first magnetic layer (magnetic domain wall displacement layer) with respect to time in the magneto-optical recoding medium of each of the first and second embodiments of the invention.

Figure 1:
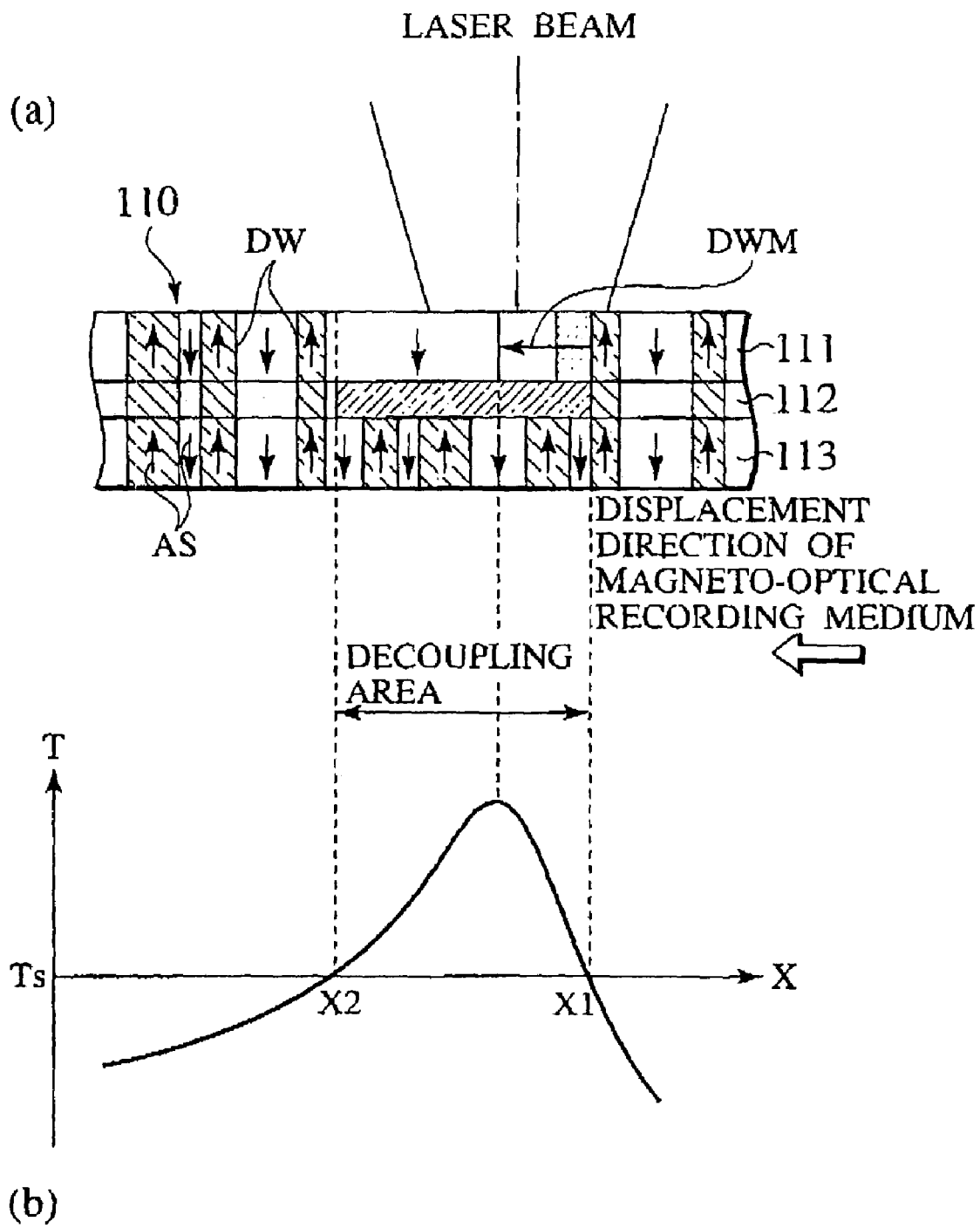
FIG. 1 is a vies for explaining an example of a conventional magneto-optical recording medium.
Figure 2:
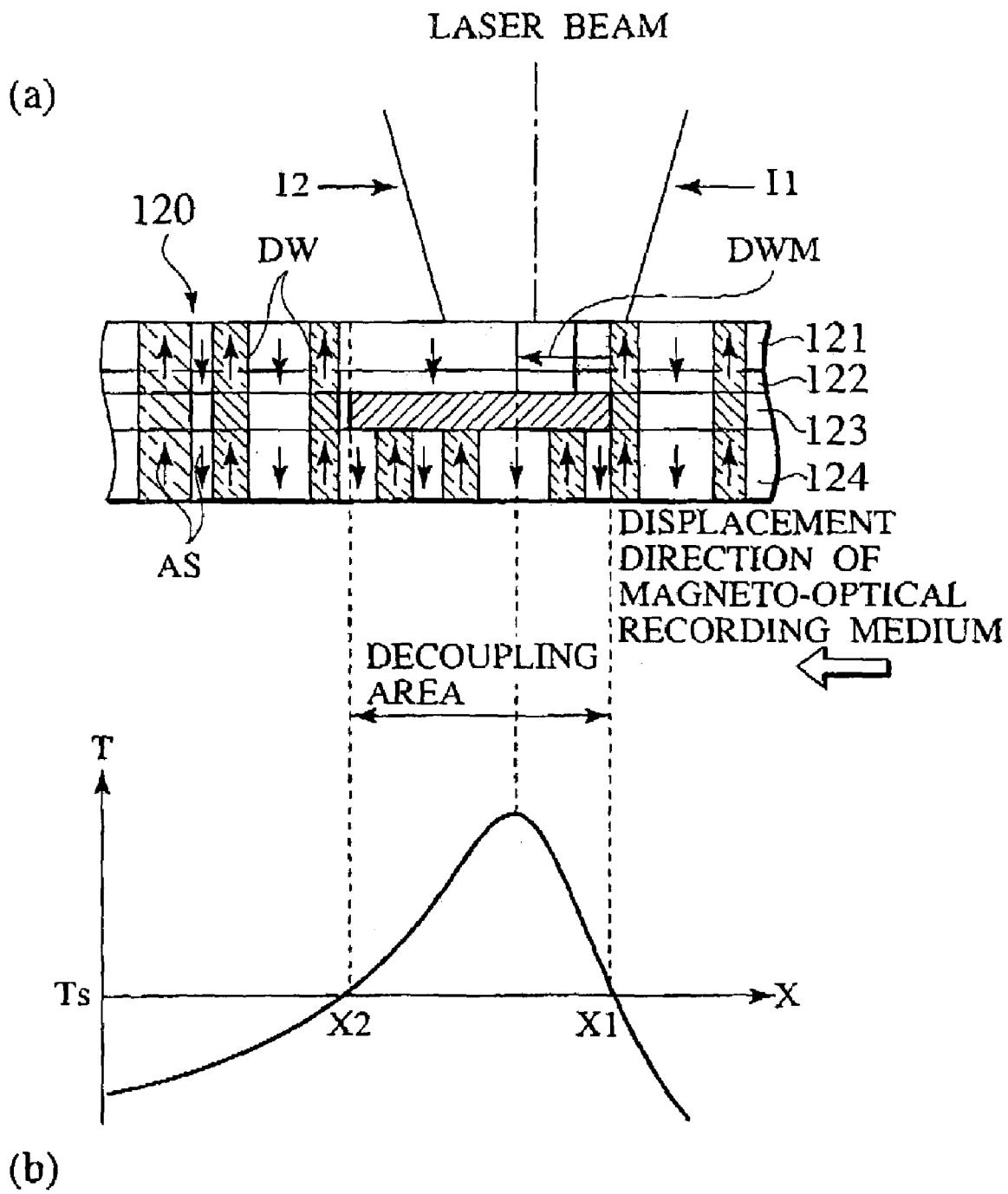
FIG. 2 is a view for explaining another example of a conventional magneto-optical recording medium.

First, in the conventional magneto-optical recording media 110 and 120 shown in FIG. 5A, (a) of FIG. 6, (a) of FIG. 7, and FIG. 8A, a Gd—Fe—Co film is merely included in the aforementioned composition range in the first magnetic layer 111 or the first magnetic layer 121 explained with FIGS. 1 and 2, and a Td—Fe—Co film is merely included in the aforementioned composition range in the first magnetic layer 111 or the first magnetic layer 121. Thus, the films can be treated considering that Walker breakdown field, described later, is greatly exceeded. The films are experimentally produced to be compared with each of the first and second magneto-optical recoding medium 10A, 20A of the invention.

In contrast, in each of the magneto-optical recording media 10A and 20A of the first and second embodiments of the invention, as described above, for the first magnetic layer 13 or 23, the material with a base of the Gd—Fe film or the Gd—Fe—Co film is used, and the magnetic characteristic is adjusted in a temperature range where the magnetic domain wall movement is realized by controlling its composition. For the third or fourth magnetic layer 15 or 26, the material with a base of the Tb—Fe—Co film or the Dy—Fe—Co film is used, and the element concentration ratio (at. % ratio) of the heavy rare earth (Tb or Dy) to the iron family metal (Fe—Co) in the third or fourth magnetic layer 15 or 26 is set in the range of $24.5 \leq Tb \leq 26.5$ or $26.5 \leq Dy \leq 29.5$. Thus, the magnetic domain wall movement can be made faster and a stray field from the third or fourth magnetic layer 15 or 26 which becomes a recording layer to the first magnetic layer 13 or 23 which becomes a magnetic domain wall displacement layer is reduced.

Hereinafter, a calculation result based on a theory of micromagnetics is shown to describe effectiveness of the present invention. The theoretical calculation is executed by molecular field approximation. Temperature characteristics of each magnetic layer of the foregoing example are actually measured, and a calculation curve is fitted on a value thereof to decide a parameter to be used for calculation. A magnetic domain wall displacement velocity is calculated by solving Landau-Lifshitz-Gilbert equation of a ferrimagnetic material to a single magnetic domain structure.

Generally, in the magneto-optical recording medium, magnetic domain wall movement of the first magnetic layer (magnetic domain wall displacement layer) 13 or 23 is started when a relation of the following equation (1) is established.

$$\frac{\partial \sigma_D}{\partial x} > 2M_s H_w + \frac{\sigma_w}{t} \tag{1}$$

In the equation (1), $\sigma_D$ denotes magnetic domain magnetic domain wall energy, $\sigma_W$ denotes interface magnetic domain wall energy by exchange coupling between the magnetic domain wall displacement layer (first magnetic layer) and the recording layer (third or fourth magnetic layer), x denotes a position coordinate of a track direction. $M_s$, $H_W$, and t denote magnetization, a magnetic domain wall coercive force, and a film thickness of the magnetic domain wall displacement layer respectively. A left side of the equation (1) indicates a driving force of magnetic domain wall movement, and a right side thereof indicates a force for blocking the magnetic domain wall movement. In a separated state of the left and right sides of the equation (1) and in a case shown in each of FIGS. 5A and 5B, magnetic domain wall movement is started from a point of intersection between curve characteristics of the left and right sides toward a shown left side (position 0 side).

FIG. 5A shows a result of the conventional magneto-optical recording medium, and FIG. 5B shows a result of the magneto-optical recoding medium 10A, 20A of each of the first and second embodiments of the invention. An abscissa shown in FIGS. 5A and 5B is a position coordinate where a spot center of a reproducing laser beam is an origin 0, and a traveling direction of the reproducing laser beam is positive. An ordinate indicates a driving force of magnetic domain wall movement and a blocking force of the magnetic domain wall movement.

Here, in the present invention shown in FIG. 5B, compared with the conventional one shown in FIG. 5A, the magnetic domain wall movement starting position is slightly shifted toward a circumferential side (right side in the drawing) of a beam spot since there occurs an increase in the magnetic domain wall energy of magnetic domain and also a steep decrease in the magnetic domain wall energy of boundary face in the vicinity of the magnetic domain wall movement starting position (in the vicinity of the point of intersection). Further, the difference between the left side and the right side immediately after the start of the magnetic domain wall movement according to the present invention is larger than that of the conventional one, that is, the driving force of magnetic domain wall at the left side of the equation (1) is large and the force for blocking the magnetic domain wall movement at the right side thereof steeply decreases. For this reason, the magnetic domain wall movement becomes sharp and a reduction in jitter characteristic which is one of reproduced signal characteristics is realized. These differences between the conventional example and the present invention are realized by the difference in composition of the magnetic domain wall displacement layer therebetween. FIG. 6 shows magnetization characteristics with respect to temperature, of the first magnetic layer (magnetic domain wall displacement layer) of each of the conventional example (a) and the present invention (b). FIG. 7 shows magnetic anisotropy characteristics with respect to temperature, of the first magnetic layer (magnetic domain wall displacement layer) of each of the conventional example (a) and the present invention (b). Here, in FIG. 7, Ku indicates a true magnetic anisotropy and $Ku-2\pi M_s^2$ indicates an effective magnetic anisotropy.

As shown by the conventional example (a) in FIG. 6, a temperature of about 460K is a compensation temperature for the conventional magneto-optical recording medium 110, 120, while as by the present invention (b) in FIG. 6, a temperature of about 300K is a compensation temperature for the magneto-optical recording medium 10A, 20A of the present invention the temperature of about 300K being nearly the room air temperature.

The characteristics with respect to temperature shown in each of FIG. 6 and FIG. 7 are results obtained by calculating based on the above mentioned the theory of micromagnetics. It was ascertained that the results conforms, with religious exactitude, to results of measurement for the first magnetic layer (the magnetic domain wall displacement layer) which was actually produced.

Next, between the conventional magneto-optical recording medium 110, 120 and the magneto-optical recording medium 10A, 20A of the present invention, the magnetic domain wall displacement velocities of the magnetic domain wall displacement layers (the first magnetic layers) are compared.

Here, to take a magnetic domain wall displacement velocity into consideration, Landau-Lifshitz-Gilbert (LLG) equation must be applied. The magnetic domain wall movement is realized by continuous magnetization reversal. However, since magnetic moment is obtained as a sum of magnetism of an electron orbit and an electron spin, and accompanied by angular momentum, in a reverse operation thereof, Larmor precession (motion where axis direction of the magnetic moment is changed) occurs. Thus, introduction of a gyromagnetic ratio necessitates the LLG equation which explains this dynamic magnetization mechanism. Furthermore, the magnetic domain wall is moved while maintaining its structure if a driving field of the magnetic domain wall is small. If a driving field of the magnetic domain wall becomes larger, the magnetic domain wall is moved while its structure itself is changed. In the former case (the driving field of the magnetic domain wall is small), a magnetic domain wall displacement velocity is substantially proportional to the driving field. In the latter case (the driving field of the magnetic domain wall is large), the magnetic domain wall displacement velocity exhibits a complex behavior with respect to the driving field, and a boundary between the former and the latter is called Walker breakdown field. Accordingly, there are roughly two magnetic domain wall displacement velocities: one is obtained as for the former and the other as for the latter.

Depending upon the filming states of the first to third magnetic layers or the first to fourth layers, the conventional magneto-optical recording medium 110, 120 corresponds to the latter (magnetic domain wall driving field is large) and is treated as the case that Walker breakdown field is greatly exceeded, while the magneto-optical recording medium 10A, 20A of the present invention corresponds to the former (magnetic domain wall driving field is small) and is treated as the case that Walker breakdown field is not exceeded.

Here, magnetic domain wall displacement velocities V in the conventional magneto-optical recording media 110 and 120 can be treated with the assumption that Walker breakdown field is greatly exceeded as described above. Thus, displacement velocities can be obtained by the following equations (2) and (3), and of the equations (2) and (3), the magnetic domain wall displacement velocity V obtained by the equation (2) is a main.

$$1 < h, \ 1/\alpha_{\text{eff}} \ll h : V = \frac{\alpha_{\text{eff}}}{1 + \alpha_{\text{eff}}^2} \gamma_{\text{eff}} \Delta_0 H \qquad (2)$$

$$h < 1 : V = \frac{\gamma_{\text{eff}}}{\alpha_{\text{eff}}} \Delta_0 H \qquad (3)$$

K: effective anisotropic constant
$M_s$: saturation magnetization
h: normalized magnetic field; $h=H/(2\pi M_s \alpha_{eff})$
$\alpha_{eff}$: Gilbert damping factor
$\gamma_{eff}$: gyromagnetic ratio
$\Delta_0$: magnetic domain wall width parameter; $\Delta_0 = \sqrt{A/K}$
A: exchange stiffness constant
H: magnetic domain wall driving field
V: magnetic domain wall displacement velocity In each of the above-described equations (2) and (3), the magnetic domain wall driving field H is normalized by a constant $2\pi$, saturation magnetization $M_s$, and Gilbert damping constant $\alpha_{eff}$, a magnetic domain wall displacement velocity V is obtained in accordance with whether a normalized magnetic field h satisfies 1<h or h<1. When this normalized magnetic field h becomes larger than 1, the magnetic domain wall displacement velocity V obtained by the equation (2) is considered to be a main magnetic domain wall displacement velocity in the conventional magneto-optical recording media 110 and 120.

On the other hand, magnetic domain wall displacement velocities V in the magneto-optical recording media 10A and 20A of the invention can both be treated with the assumption that Walker breakdown field is not exceeded as described above. Thus, displacement velocities can be obtained by the following equations (4) and (5), and of the equations (4) and (5), the magnetic domain wall displacement velocity V obtained by the equation (4) is a main.

$$1 < h : V = \frac{\gamma_{eff}}{\alpha_{eff}} \Delta_0 H \left(1 + \frac{\pi M_s^2}{K}\right)^{1/2} \quad (4)$$

$$h < 1 : V = \frac{\gamma_{eff}}{\alpha_{eff}} \Delta_0 H \left(1 + \frac{\pi M_s^2}{K}\left(1 - \sqrt{1 - \left(\frac{H}{2\pi M_s \alpha_{eff}}\right)^2}\right)\right)^{-1/2} \quad (5)$$

In each of the above-described equations (4) and (5) also, the magnetic domain wall driving field H is normalized by a constant $2\pi$, saturation magnetization $M_s$, and Gilbert damping constant $\alpha_{eff}$, a magnetic domain wall displacement velocity V is obtained in accordance with whether a normalized magnetic field h satisfies 1<h or h<1. When this normalized magnetic field h becomes smaller than 1, the magnetic domain wall displacement velocity V obtained by the equation (5) is considered to be a main magnetic domain wall displacement velocity in the magneto-optical recording media 10A and 20A of the invention.

Phenomena above (the conventional case) and below (the present invention) Walker breakdown field are caused by a difference in temperature characteristics of magnetization of the magnetic domain wall displacement layer. Because of the characteristic difference, actual magnetic domain wall movement is realized in the conventional case when the normalized magnetic field satisfies 1<h, and in the present invention case when the normalized magnetic field satisfies h>1.

Here, Gilbert damping constant $\alpha_{eff}$ can be represented by the following equation (6) using Landau-Lifshitz loss constant $\lambda_{eff}$.

$$\alpha_{eff} = \frac{\lambda_{eff}}{\gamma_{eff} M_s} \quad (6)$$

$\lambda_{eff}$: Landau-Lifshitz loss constant

In this approximate calculation, $\lambda_{eff}/\gamma_{eff}$=roughly 10 (emu/cm³). The magnetic domain wall driving field H is represented by the following equation (7) in the magnetic domain wall displacement layer of a small magnetic domain wall coercive force.

$$H = \frac{1}{2M_s} \frac{\partial \sigma_D}{\partial x} \quad (7)$$

Therefore, under an effective anisotropic constant $K \gg 2\pi M_s^2$, from the equations (6) and (7), the equation (2) can be modified to the following equation (8).

$$V = \frac{\lambda_{eff}}{M_s^2 + \frac{\lambda_{eff}^2}{\gamma_{eff}^2}} \Delta_0 \frac{1}{2} \frac{\partial \sigma_D}{\partial x} \quad (8)$$

On the other hand, from the equations (6) and (7), the equation (5) can be modified to the following equation (9).

$$V = \frac{\gamma_{eff}^2}{\lambda_{eff}} \Delta_0 \frac{1}{2} \frac{\partial \sigma_D}{\partial x} \quad (9)$$

From the equation (8) applied to the conventional magneto-optical recording media 110 and 120, it can be understood that if the saturation magnetization $M_s$ is reduced to move the magnetic domain wall by a magnetic field much larger than Walker breakdown field like the conventional one, a magnetic domain wall displacement velocity will be at its fastest when saturation magnetization $M_s$=0. In other words, this feature means that shifted from the saturation magnetization $M_s$=0, a magnetic domain wall displacement velocity becomes slower.

In contrast, from the equation (9) applied to the magneto-optical recording media 10A and 20A of the invention, it can be understood that if the saturation magnetization $M_s$ is increased to move the magnetic domain wall by a magnetic field equal to or less than Walker breakdown field like the embodiment of the present invention, a magnetic domain wall displacement velocity is always fast independent upon the saturation magnetization $M_s$.

FIGS. 8A and 8B show plots of changes of a magnetic domain wall displacement velocity and a magnetic domain wall position with respect to time, in the conventional magneto-optical recording medium 110 and 120 and in the magneto-optical recording medium 10A and 20A of the invention, respectively. In each figure, a position of an ordinate is a position coordinate of a track direction where a spot center of a reproducing laser beam is an origin 0, and a traveling direction of the reproducing laser beam is positive. Comparing FIGS. 8A and 8B with each other, it takes more than about 5 ns. to complete the magnetic domain wall displacement in the conventional magneto-optical recording medium 110 and 120, while it takes less than 2 ns. to do that in the magneto-optical recording medium 10A and 20A of the invention. Namely, it is understood that, compared with the time for the conventional magneto-optical recording medium 110 and 120, the time for the magneto-optical recording medium 10A and 20A of the invention is remarkably shortened.

Because of the difference in the magnetic domain wall displacement velocity, a jitter characteristic which is one of reproduced signal characteristics is sharply improved as to the magneto-optical recording medium 10A and 20A of the invention.

Here, as for the magneto-optical recording medium 10A and 20A of the invention which realized the improvement of the characteristic by increasing the saturation magnetization $M_s$ in a temperature range where the magnetic domain wall displacement is realized, a stray field in the magnetic domain wall displacement layer (the first magnetic layer 13 or the first magnetic layer 23) cannot be neglected because the saturation magnetization $M_s$ is large. Therefore, further improvement is required in order to realize higher-density recording/reproducing. In the vicinity of a magnetic domain wall movement starting position, since a temperature of a traveling direction forward area of the magnetic domain wall is high, and magnetization of the magnetic domain wall movement area becomes larger compared with other areas, which is understood from the magnetization change with respect to temperature shown in (b) of FIG. 6, a stray field is small in a magnetic domain to be enlarged. In other words, since the magnetization change with respect to temperature shown in (b) of FIG. 6 forms an upwardly-convex curb in the magnetic domain wall displacement temperature range (about 430K to about 490K), the magnetization of a traveling direction forward area of the magnetic domain wall becomes larger in the first half of the magnetic domain wall moving process. As magnetostatic energy is reduced to be stabilized in a magnetic domain wall formed in an area of large magnetization, a stray field has a function of assisting the magnetic domain wall movement. In contrast, the magnetization of a traveling direction forward area of the magnetic domain wall becomes smaller in the latter part of the magnetic domain wall moving process. Further, in the vicinity of a magnetic domain wall movement completion position, since a repulsive force from a magnetic domain wall of a magnetic domain of a former signal becomes larger in proportion to the stray field, if the stray field is large, the stray field has a function of blocking the magnetic domain wall movement.

Therefore, in the magneto-optical recording media 10A and 20A of the first and second embodiments according to the invention, to solve the above-described problem, studies were conducted to improve the third or fourth magnetic layer 15 or 26 which becomes a recording layer as follows.

Hereinafter, description is made of the third or fourth magnetic layer 15 or 26 in the magneto-optical recording medium 10A or 20A of the first or second embodiment of the invention by referring to FIGS. 9 to 13.

Figure 11:
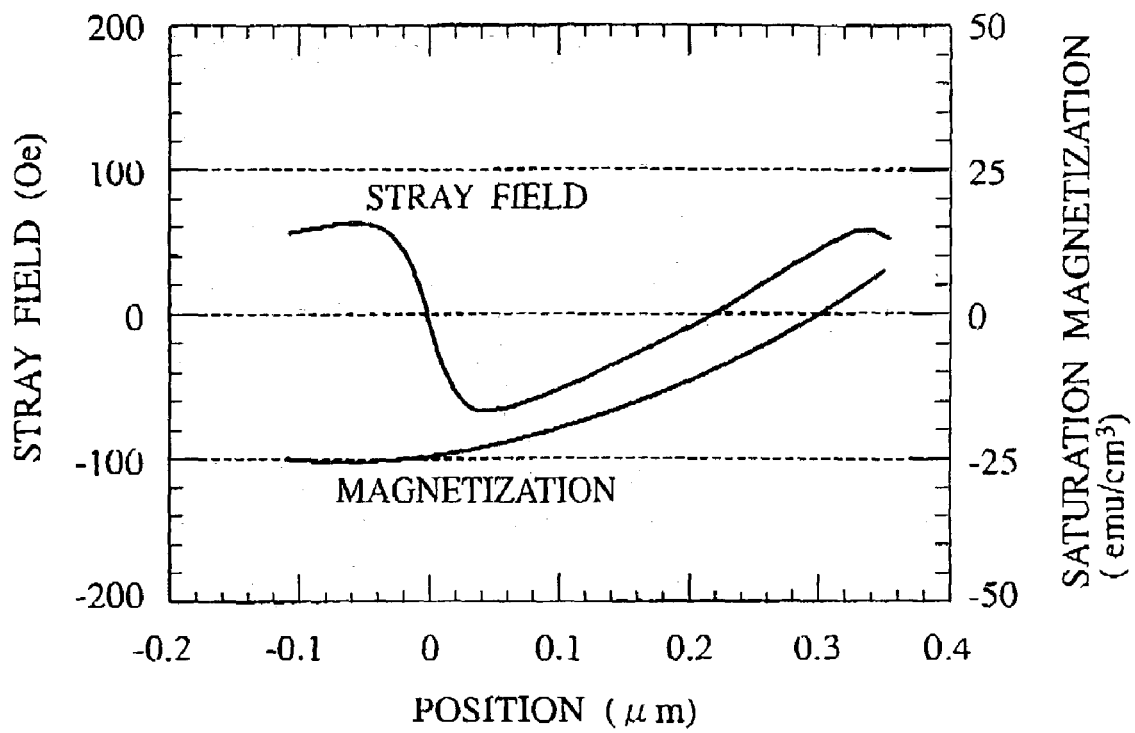
FIG. 11 is a view similarly showing a change of the stray field when an element concentration ratio is 25.5 at. %.
Figure 12:
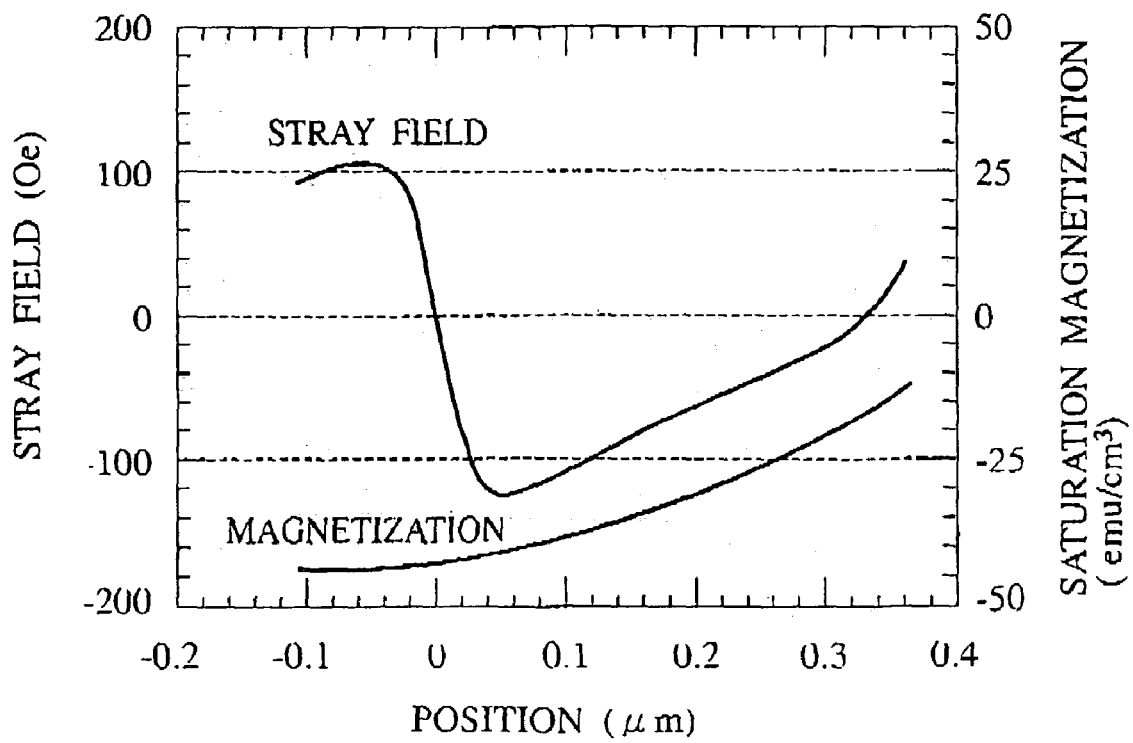
FIG. 12 is a view similarly showing a change of the stray field when an element concentration ratio is 24.5 at. %.
Figure 13:
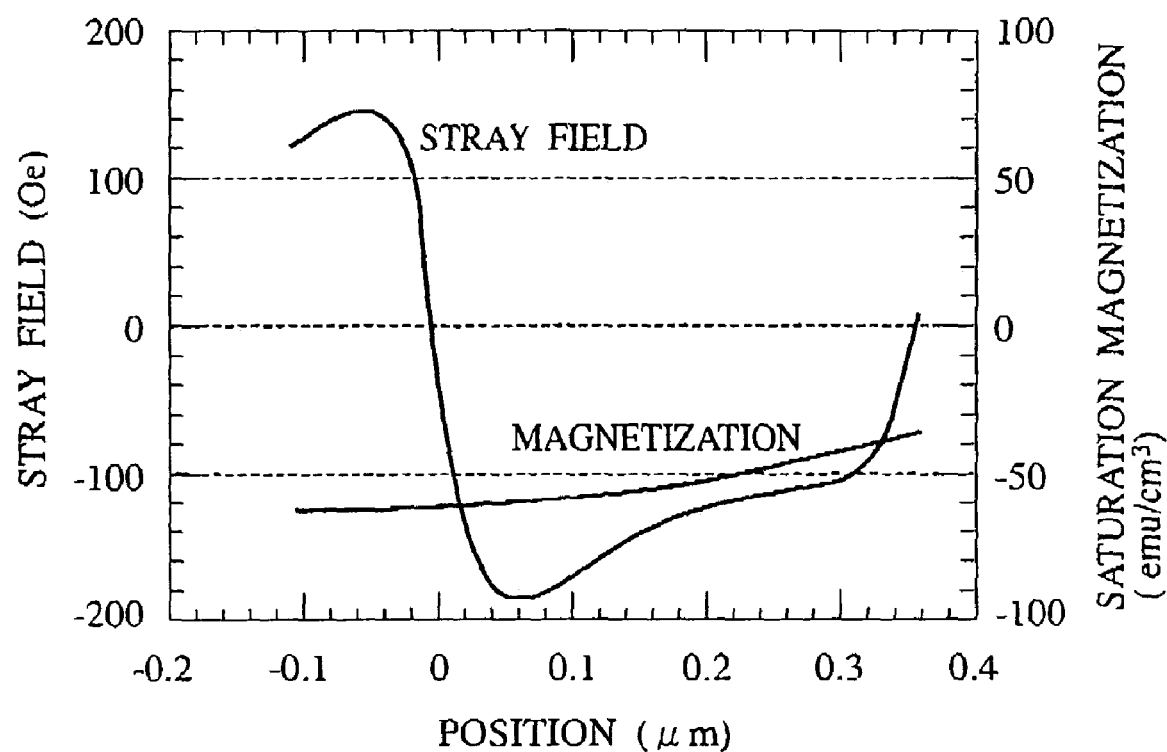
FIG. 13 is a view similarly showing a change of the stray field when an element concentration ratio is 23.5 at. %.

FIG. 9 shows a change of a stray field when an element concentration ratio of heavy rare earth (Tb) to iron family metal (Fe—Co) contained in the third or fourth magnetic field 15 or 26 is 27.5 at. % in the magneto-optical recording medium of the first or second embodiment of the invention. FIG. 10 similarly shows a change of a stray field when an element concentration ratio is 26.5 at. %. FIG. 11 similarly shows a change of a stray field when an element concentration ratio is 25.5 at. %. FIG. 12 similarly shows a change of a stray field when an element concentration ratio is 24.5 at. %. FIG. 13 similarly shows a change of a stray field when an element concentration ratio is 23.5 at. %.

Studies were conducted on a change of a stray field from the third or fourth magnetic layer 15 or 26 with respect to a composition change of the third or fourth magnetic layer 15 or 26 which becomes a recording layer in the magneto-optical recording medium 10A or 20A of the first or second embodiment of the invention. Results are shown in each of FIGS. 8 to 12. Each of FIGS. 8 to 12 shows an example where a Tb—Fe—Co film is formed in the third or fourth magnetic layer 15 or 26 which becomes a recording layer. A position of an abscissa is a position coordinate of a track direction where a spot center of a reproducing laser beam is an origin 0, and a traveling direction of the reproducing laser beam is positive. In this case, the position of the abscissa also indirectly indicates a temperature change by Gaussian distribution of the reproducing laser beam.

In each of FIGS. 9 to 13, together with a stray field, saturation magnetization of the third or fourth magnetic layer 15 or 26 in which the stray field is generated is also shown as a reference. In an ordinate of each of the stray field and the saturation magnetization, a − direction indicates downward magnetization if a + direction indicates upward magnetization, and a scale unit of the saturation magnetization of only FIG. 13 is double of that of each of FIGS. 9 to 12.

The magnetic domain wall of a very small recording mark recorded in the third or fourth magnetic layer 15 or 26 which becomes a recording layer is moved toward a former recording mark. Accordingly, when a random modulation signal is recorded in the third or fourth magnetic layer 15 or 26 which becomes a recording layer, a repulsive force from the former recording mark must also be taken into consideration. Thus, the studies here assume the presence of a magnetic domain wall in the third or fourth magnetic layer 15 or 26 directly below the center of the reproducing laser beam (origin position in track direction position coordinate). Results shown in FIGS. 8 to 12 respectively correspond to cases where element concentration ratios of heavy rare earth (Tb) to iron family metal (Fe—Co) contained in the third or fourth magnetic layer 15 or 26 are 27.5 at. %, 26.5 at. %, 25.5%, 24.5%, and 23.5%.

According to the magneto-optical recording medium 10A and 20A of the invention, in the first magnetic layer 13 or 23 which becomes a magnetic domain wall displacement layer, magnetization of an iron family sub-lattice is predominant in a magnetic domain wall movement temperature area (about 430K to about 490K). Accordingly, in the case where a stray field from the third or fourth magnetic layer 15 or 26 which becomes a recording layer is plus, the stray field acts in a direction of assisting the magnetic domain wall movement of the magnetic domain wall displacement layer. For this reason, it is preferable that a minus stray field is controlled to be comparatively small in the middle of the magnetic domain wall moving process and a comparatively large plus stray field is generated immediately before the completion of the magnetic domain wall movement.

Thus, judging from the characteristic views of the stray field shown in FIGS. 9 to 13, an element concentration ratio (at. % ratio) of Tb to Fe—Co should preferably be set in a range of $24.5 \leq Tb \leq 26.5$ when the Tb—Fe—Co film is used for the third or fourth magnetic layer 15 or 26 which becomes a recording layer. On the other hand, the stray fields from the third or fourth magnetic layer 15 or 26 which becomes a recording layer when the film thickness of the third or fourth magnetic layer 15 or 26 is 80 nm. are shown in the figures. Accordingly, it becomes possible to control the influence of the stray field to be smaller if the film thickness is reduced to be less that 80 nm. Here, a lower limit value of the film thickness of the third or fourth magnetic layer 15 or 26 may be any value as far as a micro recording mark can be stably and surely obtained.

Characteristics shown in FIGS. 9 to 13 are present in the case of forming the Tb—Fe—Co film in the third or fourth magnetic layer 15 or 26 which becomes a recording layer. However, studies were conducted similarly to the foregoing for the case of forming a Dy—Fe—Co film in the third or fourth magnetic layer 15 or 26, and it was found that an element concentration ratio (at. % ratio) of Dy to Fe—Co should preferably be set in a range of $26.5 \leq Dy \leq 29.5$ when the Dy—Fe—Co film was used for the third or fourth magnetic layer 15 or 26.

In the above composition range, by combination of the first magnetic layer 13 with the third magnetic layer 15 in the magneto-optical recording medium 10A, or by combination of the first magnetic layer 23 with the fourth magnetic layer 26 in the magneto-optical recording medium 20A, and by optimization of the film thickness of the third or fourth magnetic layer 15 or 26 which becomes a recording layer, effects from the stray field are reduced, the magneto-optical recording medium 10A or 20A of the invention always having a fast magnetic domain wall displacement velocity is realized, and a jitter characteristic which is one of reproduced signal characteristics is greatly improved.

MODIFIED EXAMPLES 1 AND 2

Next, description will be made of other improved examples capable of reducing a stray field leaked from the third or fourth magnetic layer 15 or 26 which becomes a recording layer to the first magnetic layer 13 or 23 which becomes a magnetic domain wall displacement layer, and simultaneously enhances recording magnetic field sensitivity with reference to FIGS. 14 to 21.

Figure 14:
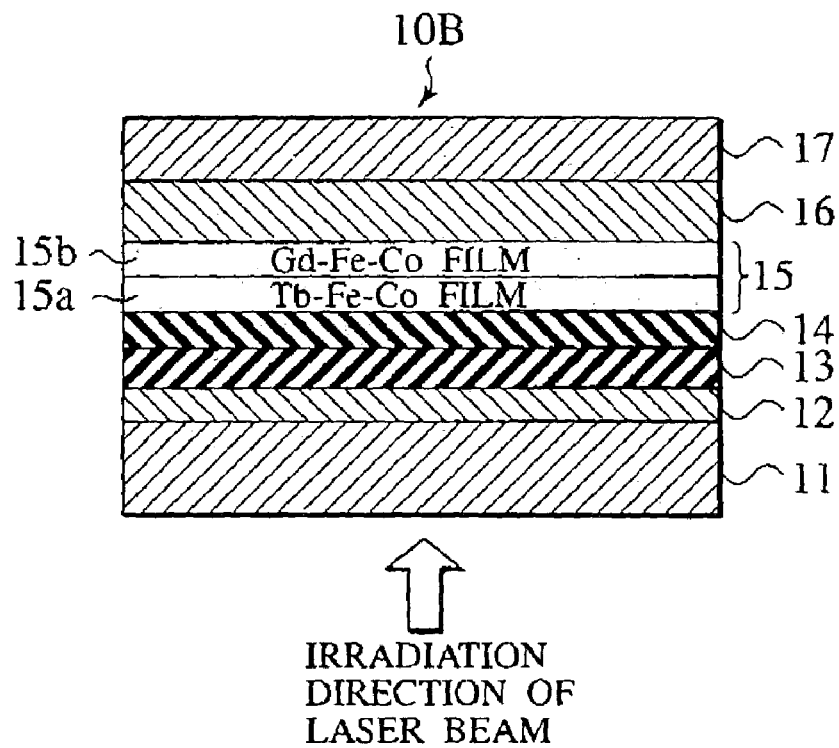
FIG. 14 is a sectional view schematically showing layer formation of a modified example 1 obtained by partially modifying the magneto-optical recording medium of the first embodiment of the invention.
Figure 15:
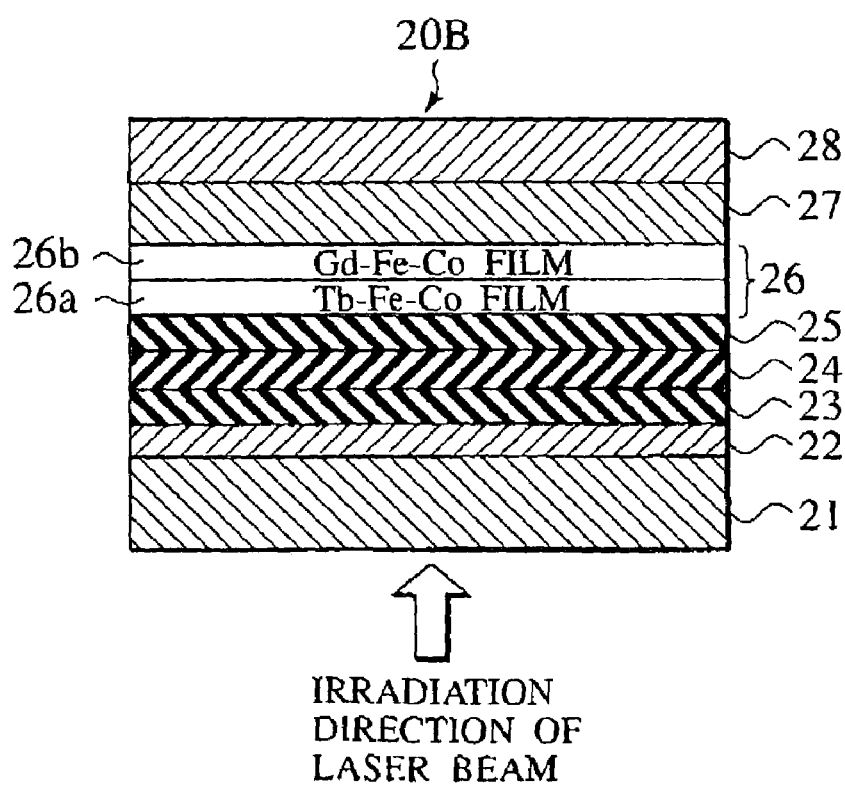
FIG. 15 is a sectional view schematically showing layer formation of a modified example 2 obtained by partially modifying the magneto-optical recording medium of the second embodiment of the invention.

FIG. 14 is a sectional view schematically showing layer structure of a modified example 1 of a partially modified magneto-optical recording medium of the first embodiment of the invention. FIG. 15 is a sectional view schematically showing layer structure of a modified example 2 of a partially modified magneto-optical recording medium of the second embodiment of the invention.

Figure 16:
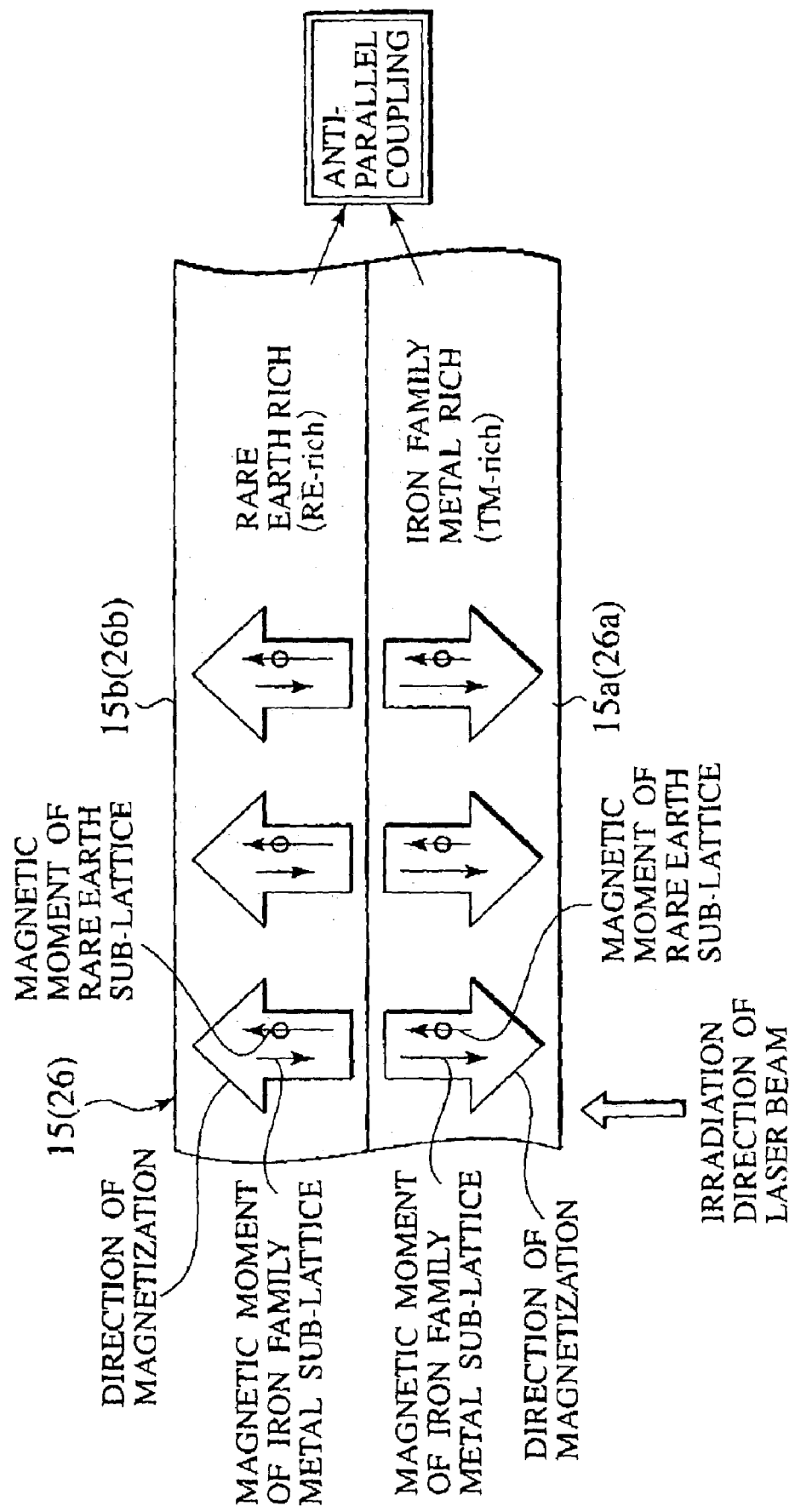
FIG. 16 is a view schematically showing anti-parallel coupling which becomes stable if magnetization directions of two layers are opposite to each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 16 is a view schematically showing anti-parallel coupling which becomes stable if magnetization directions of two films are opposite to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 17:
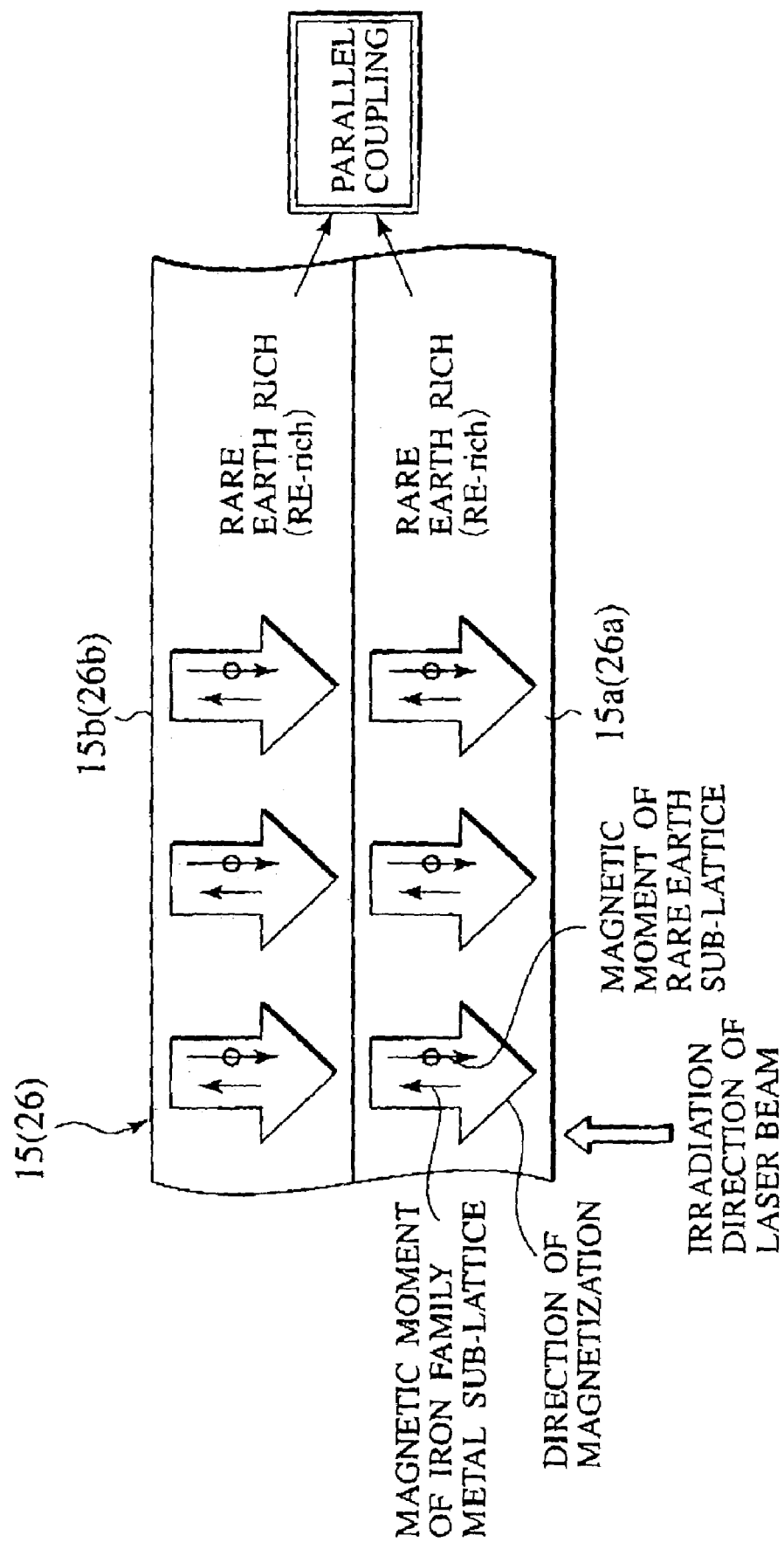
FIG. 17 is a view schematically showing rare earth rich (RE-rich) parallel coupling which becomes stable if magnetization directions of two layers are the same as each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 17 is a view schematically showing rare earth rich (RE-rich) parallel coupling which becomes stable if magnetization directions of two films are similar to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 18:
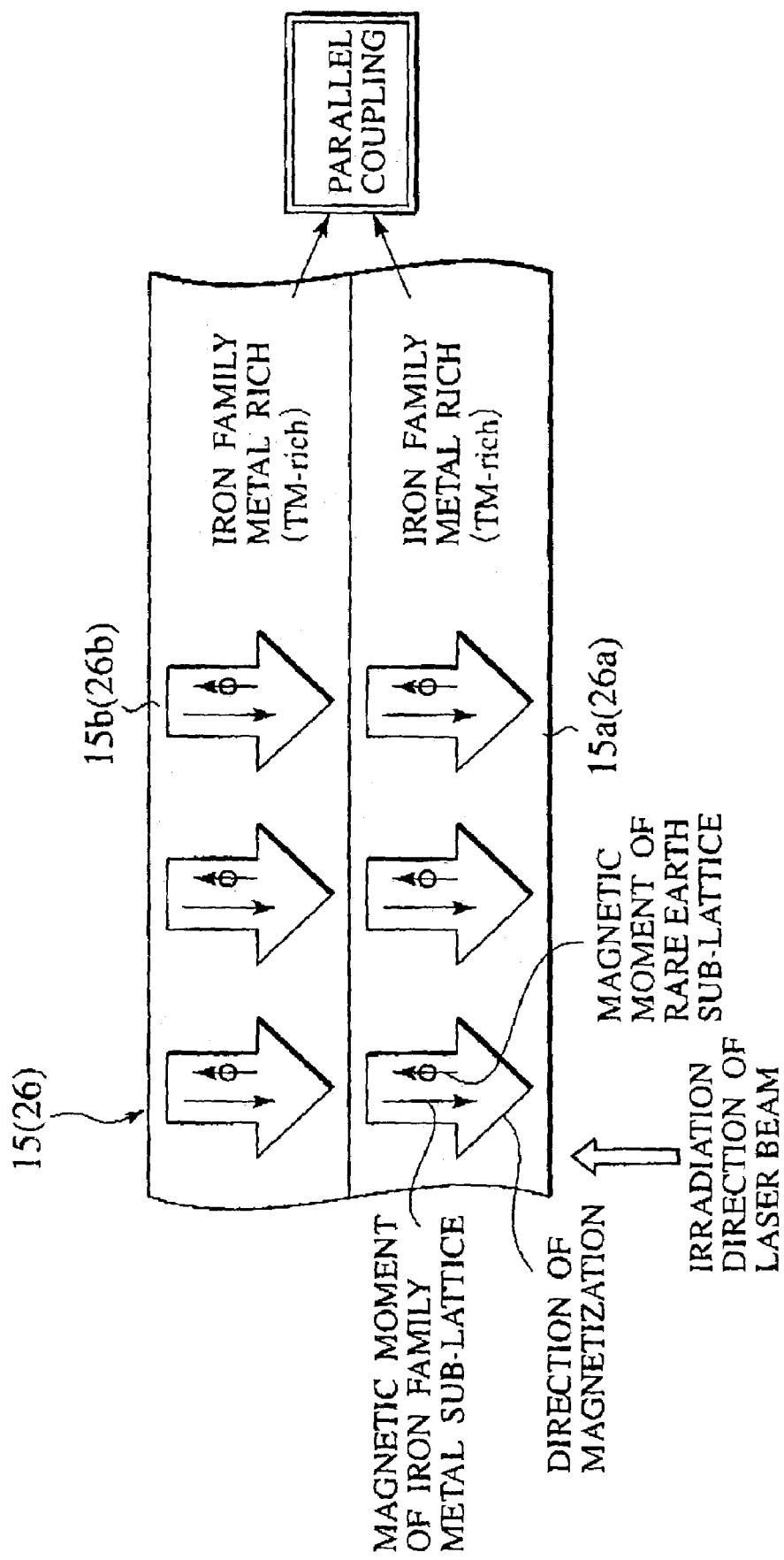
FIG. 18 is a view schematically showing iron family metal rich (TM-rich) parallel coupling which becomes stable if magnetization directions of two layers are the same as each other when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 18 is a view schematically showing iron family metal rich (TM-rich) parallel coupling which becomes stable if magnetization directions of two films are similar to each other when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 19:
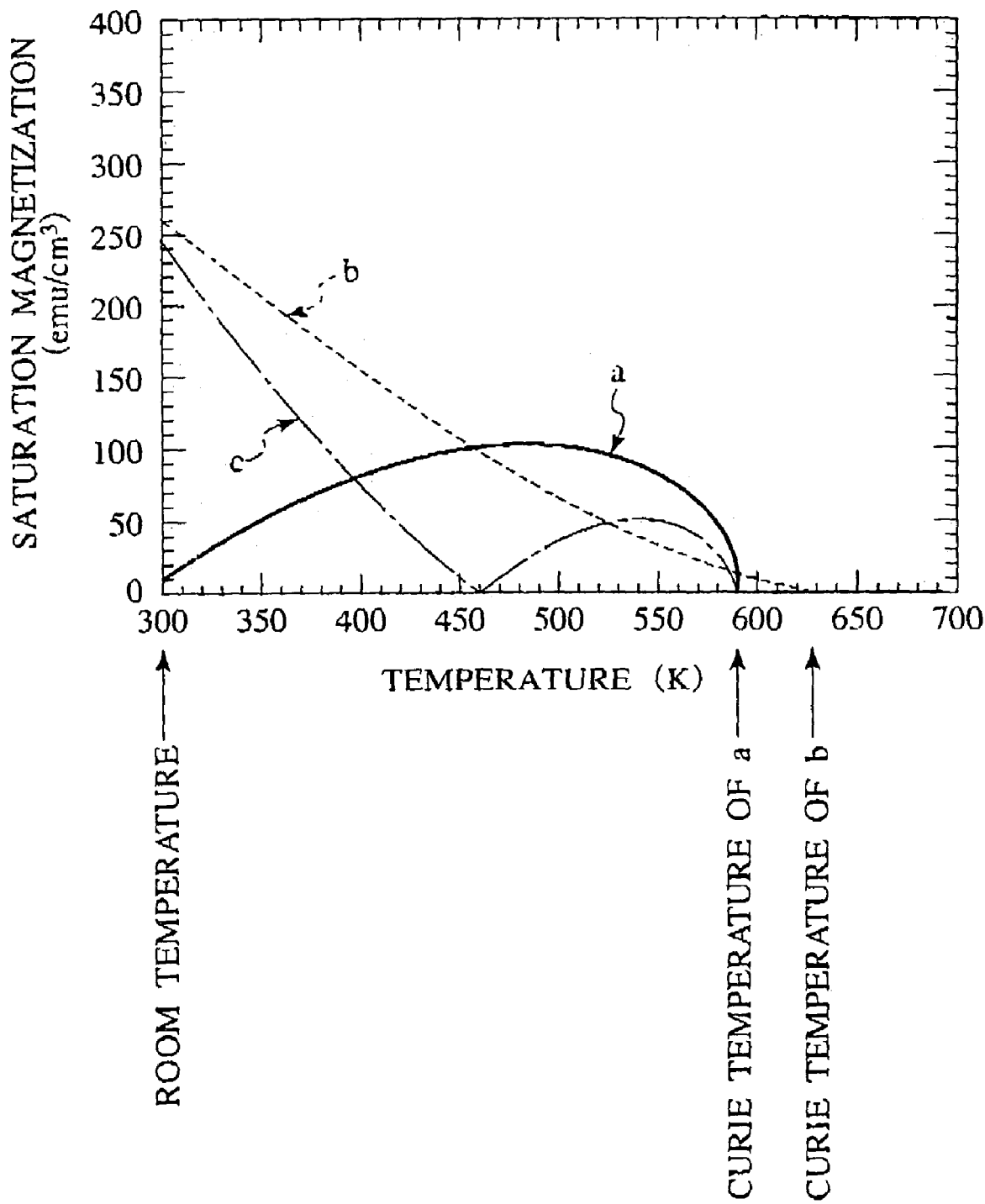
FIG. 19 is a characteristic view of a two-layer film which always maintains anti-parallel coupling from room temperature to Curie temperature when the third (or fourth) magnetic layer is formed as a two-layer film made of a Tb—Fe—Co film and a Gd—Fe—Co film, in the magneto-optical recording medium of the modified example 1 (or magneto-optical recording medium of the modified example 2)

FIG. 19 is a characteristic view of two films which always maintain anti-parallel coupling from room temperature to Curie temperature when the third (or fourth) magnetic layer is made of the two films, i.e., a Tb—Fe—Co film and a Gd—Fe—Co film, in the magneto-optical recording medium of the modified example 1 (or magneto-optical recording medium of the modified example 2).

Figure 20:
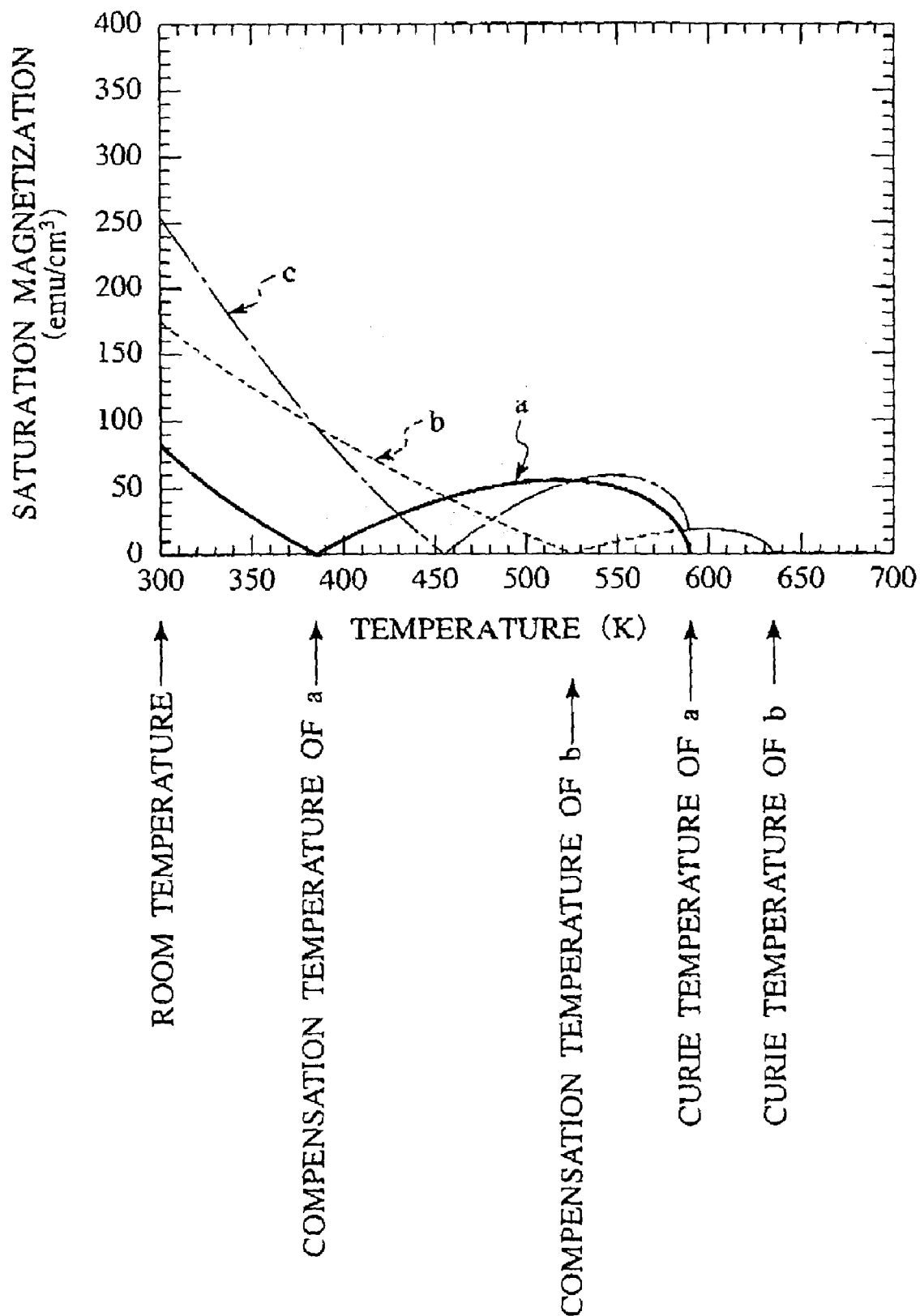
FIG. 20 is a characteristic view of a two-layer film which becomes parallel coupling of an RE-rich film from room temperature to about 385 K (compensation temperature of a), anti-parallel coupling from about 385 K to about 530 K (compensation temperature of b), and parallel coupling of a TM-rich film from about 530 K to Curie temperature, when the third (or fourth) magnetic layer is formed as a two-layer film made of a Tb—Fr—Co film and a Gd—Fe—Co film, in the magneto-optical recording medium of the modified example 1 (or magneto-optical recording medium of the modified example 2)

FIG. 20 is a characteristic view of two layers which become parallel coupling of an RE-rich film from room temperature to about 385 K (compensation temperature of d), anti-parallel coupling from about 385 K to about 530 K (compensation temperature of b), and parallel coupling of a TM-rich film from about 530 K to Curie temperature, when the third(or fourth) magnetic layer is made of the two films, i.e., a Tb—Fr—Co film and a Gd—Fe—Co film, in the magneto-optical recording medium of the modified example 1 (or magneto-optical recording medium of the modified example 2).

Figure 21:
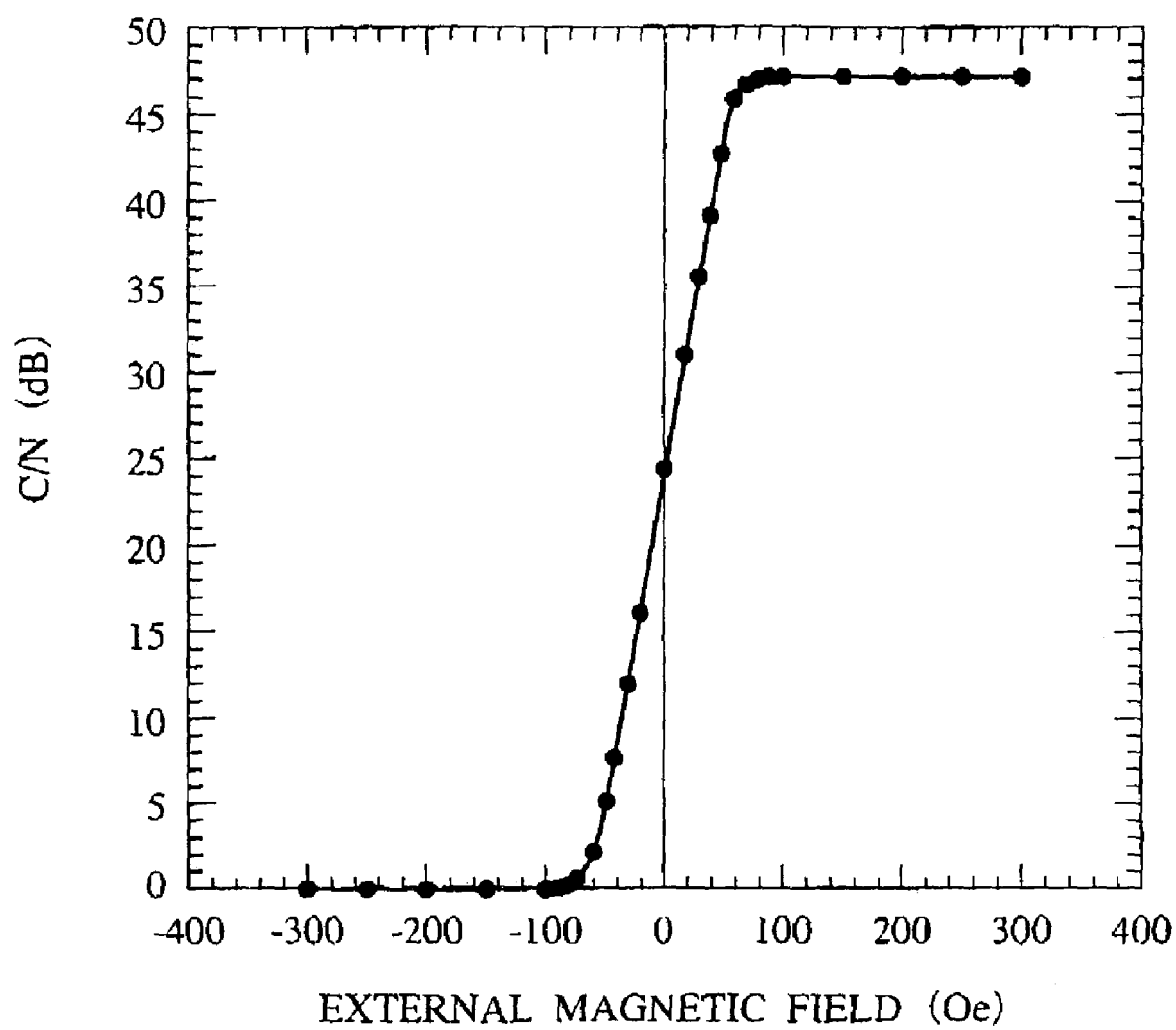
FIG. 21 is a view showing a result of reducing a recording magnetic field of the third (or fourth) magnetic field made of a Tb—Fe—Co film and a Gd—Fe—Co film in the magneto-optical recording medium of the modified example 1 (or magneto-optical recording medium of the modified example 2).

FIG. 21 shows a result of reducing a recording magnetic field of the third (or fourth) magnetic field made of a Tb—Fe—Co film and a Gd—Fe—Co film in the magneto-optical recording medium of the modified example 1 (or magneto-optical recording medium of the modified example 2).

First, as shown in FIG. 14, a magneto-optical recording medium 10B of the modified example 1 which is a partial modification of the magnet-optical recording medium of the first embodiment of the invention is different from the magneto-optical recording medium 10A of the first embodiment described above with reference to FIG. 3 only in a film forming method of a third magnetic layer 15, and similar in other components. Thus only differences are described. In the modified example 1 the third magnetic layer 15 is made of two films, i.e., a Tb—Fe—Co film 15a and a Gd—Fe—Co film 15b, to become a ferrimagnetic perpendicular magnetization film made of heavy rare earth and iron family metal. In this case, in the third magnetic layer 15 made of the Tb—Fe—Co film 15a and the Gd—Fe—Co film 15b, preferably, the Tb—Fe—Co film 15a of large magnetic anisotropy is formed towards a side irradiated with a laser beam and, accordingly, the Gd—Fe—Co film 15b is laminated on the Tb—Fe—Co film 15a.

Then, as shown in FIG. 15, a magneto-optical recording medium 20B of the modified example 2 which is a partial modification of the magnet-optical recording medium of the second embodiment of the invention is different from the magneto-optical recording medium 20A of the second embodiment described above with reference to FIG. 4 only in a film forming method of a fourth magnetic layer 26, and similar in other components. Thus, only differences are described. In the modified example 2, the fourth magnetic layer 26 is made of two films, i.e., a Tb—Fe—Co film 26a and a Gd—Fe—Co film 26b, to become a ferrimagnetic perpendicular magnetization film made of heavy rare earth and iron family metal. In this case, in the fourth magnetic layer 26 made of the Tb—Fe—Co film 26a and the Gd—Fe—Co film 26b, preferably, the Tb—Fe—Co film 26a of large magnetic anisotropy is formed towards a side irradiated with a laser beam and, accordingly, the Gd—Fe—Co film 26b is laminated on the Tb—Fe—Co film 26a.

As shown in each of FIGS. 16 to 18, in the third magnetic layer 15 (or fourth magnetic layer 26) made of the Tb—Fe—Co film 15a (or 26a) and the Gd—Fe—Co film 15b (or 26b), an arrow having no O mark indicates magnetic moment of an iron sub-lattice, an arrow having a O mark indicates magnetic moment of a rare earth sub-lattice, and a length of the arrow indicating the magnetic moment of each sub-lattice represents a magnitude of each sub-lattice magnetization. Furthermore, a large arrow having space inside which includes arrows of a rare earth sub-lattice and an iron sub-lattice indicates a direction of magnetization. In this case, a case where rare earth metal is more predominant than transition metal, it is called rare earth rich (RE-rich), and a case where transition metal is more predominant than rare earth metal, it is called iron rich (TM-rich).

The Tb—Fe—Co film 15a (or 26a) and the Gd—Fe—Co film 15b (or 26b) in the third magnetic layer 15 (or fourth magnetic layer 26) can take one of the anti-parallel coupling which becomes stable in an anti-parallel state where magnetization directions of two films are opposite to each other as shown in FIG. 16, the rare earth rich (RE-rich) parallel coupling which becomes stable in a parallel state where magnetization directions of two films are similar to each other as shown in FIG. 17, and the iron rich (TM-rich) parallel coupling which becomes stable in a parallel state where magnetization directions of two films are similar to each other as shown in FIG. 18, under the following conditions shown in FIG. 19 or 20.

That is, as shown in FIG. 19, in the 2-layer film of the third magnetic layer 15 (or fourth magnetic layer 26), a reference code a denotes temperature characteristics of the iron rich (TE-rich) Tb—Fe—Co film 15a (or 26a), and b denotes temperature characteristics of the rare earth rich (RE-rich) Gd—Fe—Co film 15b (or 26b). Both films 15a and 15b (or 26a and 26b) always maintain anti-parallel coupling similar to that shown in FIG. 16 from room temperature near 300K to Curie temperature of the Tb—Fe—Co film 15a (or 26a).

Here, while the two films of the third magnetic layer 15a (or fourth magnetic layer 26) maintain the anti-parallel coupling, a difference c=a−b between the temperature characteristics a of the iron rich (TE-rich) Tb—Fe—Co film 15a (or 26) and the temperature characteristics b of the rare earth rich (RE-rich) Gd—Fe—Co film 15b (or 26b) is calculated to obtain apparent magnetization temperature characteristics.

As obvious from the drawings, in a temperature area in which reproducing is executed by magnetic domain wall displacement in the first magnetic layer 13 (or 23), i.e., about 430K to about 490K, because of the anti-parallel coupling of the two films of the third magnetic layer 15 (or fourth magnetic layer 26), the apparent magnetization is limited small to about 20 emu/cm³ or lower. In this case, a exchange coupling force which is a micro-scale interaction of atoms is applied between the iron rich (TE-rich) Tb—Fe—Co film 15a (or 26a) and the rare earth rich (RE-rich) Gd—Fe—Co film 15b (or 26b) while a force by a stray field leaked from the third magnetic layer 15 (or fourth magnetic layer 26) which becomes a recording layer to the first magnetic layer 13 (or 23) which becomes a magnetic domain wall displacement layer is a macro-scale magnetostatic force. It can be understood that such a stray field in the two anti-parallel films can be reduced by making directions of magnetization of the films 15a and 15b (or 26a and 26b) opposite to each other, and reducing a difference in magnetization, that is, reducing the apparent magnetization. Thus, in the temperature range (about 430K to about 490K) in which reproducing is executed by the magnetic domain wall displacement in the first magnetic layer 13 (or 23), the anti-parallel coupling which becomes stable when the directions of magnetization of the two films of the third magnetic layer 15 (or fourth magnetic layer 26) become opposite to each other is maintained, whereby the stray field leaked from the recording layer to the magnetic domain wall displacement layer can be reduced.

Then, when the amount of Tb in the Tb—Fe—Co film 15a (or 26a) is increased, and the amount of Gd in the Gd—Fe—Co film 15b (or 26b) is reduced in the two films of the third magnetic layer 15 (or fourth magnetic layer 26) shown in FIG. 19, two films of the third magnetic layer (or fourth magnetic layer 26) having characteristics shown in FIG. 20 are obtained. In FIG. 20, a reference code a denotes temperature characteristics of the Tb—Fe—Co film 15 (or 26a), and b temperature characteristics of the Gd—Fe—Co film 15b (or 26b). Furthermore a reference code a denotes apparent magnetization temperature characteristics by the temperature characteristics a of the Tb—Fe—Co film 15a (or 26a) and the temperature characteristics b of the Gd—Fe—Co film 15b (or 26b).

In the example shown in FIG. 20, in the case of the Tb—Fe—Co film 15a (or 26a) of the third magnetic layer 15 (or fourth magnetic layer 26), a coercive force maximizes in the vicinity of about 385K, and there is a compensation temperature where sub-lattice magnetizations of the rare earth and the iron family metal become roughly equal to each other. On the other hand, in the case of the Gd—Fe—Co film 15b (or 26b), a coercive force is maximized in the vicinity of about 530K, and there is a compensation temperature where sub-lattice magnetizations of the rare earth and the iron metal become roughly equal to each other. Each of the above compensation temperatures has characteristics that a direction of magnetization decided by a magnitude relation of the sub-lattice magnetizations of the rare earth metal and the iron family metal is reversed at the boundary of the compensation temperature.

More specifically, in the third magnetic layer 15 (or fourth magnetic layer 26), parallel coupling of the RE-rich film similar to that shown in FIG. 17 is set from the room temperature near 300K to about 385K (compensation temperature of a). At the time of the parallel coupling of the RE-rich film, the temperature characteristics c of the apparent magnetization becomes a value which is an addition of the temperature characteristics a of the Tb—Fe—Co film 15a (or 26a) and the temperature characteristics b of the Gd—Fe—Co film 15b (or 26b). From about 385K to about 530K (compensation temperature of b), anti-parallel coupling similar to that shown in FIG. 16 is set. At the time of this anti-parallel coupling, the temperature characteristics C of the apparent magnetization becomes a value of a difference between the temperature characteristics a of the Tb—Fe—Co film 15a (or 26a) and the temperature characteristics b of the Gd—Fe—Co film 15b (or 26b). Furthermore, from about 530K to Curie temperature of the Tb—Fe—Co film 15a (or 26a), parallel coupling of a TM-rich film similar to that shown in FIG. 18 is set. At the time of this parallel coupling of the TM-rich film, the temperature characteristics of the apparent magnetization take a value which is an addition of the temperature characteristics a of the Tb—Fe—Co film 15a (or 26a) and the temperature characteristics b of the Gd—Fe—Co film 15b (or 26b). In other words, the parallel coupling of the RE-rich film shown in FIG. 18 is set at the room temperature, the anti-parallel coupling shown in FIG. 16 is set at the reproducing temperature and the parallel coupling of the TE-rich film shown in FIG. 18 is set at the recording temperature.

Also in the example shown in FIG. 20, as obvious from the drawing, in a temperature range in which reproduction is executed by the magnetic domain wall displacement in the first magnetic layer 13 (or 23), i.e., from about 430K to about 490K, because of the anti-parallel coupling of the two films of the third magnetic layer 15 (or fourth magnetic layer 26), the apparent magnetization is limited minimally to about 20 emu/cm³. Thus, in the temperature range (about 430K to about 490K) in which the reproducing is executed by the magnetic domain wall movement in the first magnetic layer 13 (or 23), the anti-parallel coupling is set, which becomes stable when directions of the magnetizations of the two films of the third magnetic layer 15 (or fourth magnetic layer 26) are made opposite to each other. Accordingly, a stray field leaked from the recording layer to the magnetic domain wall displacement layer can be reduced.

By using the two films, i.e., the Tb—Fe—Co film 15a (or 26a) and the Gd—Fe—Co film 15b (or 26b) for the third magnetic layer 15 (or fourth magnetic layer 26) which becomes a recording layer, a recoding magnetic field can be simultaneously reduced as shown in FIG. 21. That is FIG. 21 shows a result to examining recording magnetic field sensitivity by optical modulation recording. When a recording external magnetic field of an abscissa is changed from a negative side which is a deletion direction to a positive side which is a recording side, an absolute value of a negative magnetic field in which C/N rises, and a magnitude of a positive magnetic field in which C/N is saturated are reduced, whereby magnetic field sensitivity is enhanced. In the case of the optical modulation recording, generally, a weak DC external magnetic field is applied in a recording direction, and a laser beam is applied to this to add heat in accordance with presence of a signal. Then, a coercive force is reduced to the reverse direction of magnetization in accordance with the external magnetic field. Thus, based on a direction of a magnetic domain thereof, information of "1", and "0" is recorded.

From the result of FIG. 21, it can be understood that the recording magnetic field sensitivity of the two layers of the anti-parallel exchange coupling in the third magnetic layer 15 (or fourth magnetic layer 26) is greatly reduced by about 60 Oe. Normally, compared with the Tb—Fe—Co film 15a (or 26a) used as the recording layer, vertical magnetic anisotropy of the Gd—Fe—Co film 15b (or 26b) of the anti-parallel exchange coupling is small, and a coercive force is extremely small at a temperature off the compensation temperature, whereby recording can be executed by a small external magnetic field. Accordingly, a recording mechanism is employed where the recorded magnetic domain is transferred to the Tb—Fe—Co film 15a (or 26a) by exchange coupling to be maintained stable. Thus, recording magnetic sensitivity can be enhanced.

It should be understood that many modifications and adaptations of the invention will become apparent to those skilled in the art and it is intended to encompass such obvious modifications and changes in the scope of the claims appended hereto.

What is claimed is:

1. A magneto-optical recording medium having multiple magnetic layers comprising:
   a first magnetic layer;
   a second magnetic layer; and
   a third magnetic layer,
   the first to third magnetic layers being sequentially formed from a side irradiated with a laser beam, during recording, an information signal being recorded in a form of a magnetic domain in the third magnetic layer having an easy magnetization axis in a vertical direction by an external magnetic field while the laser beam irradiation is executed, then the magnetic domain being exchanged through the second magnetic layer with the first magnetic layer and, during reproducing, magnetization of the second magnetic layer being lost by a temperature raised by the laser beam irradiation, and magnetic domain wall displacement being generated to enlarge the magnetic domain formed by the exchange coupling in the first magnetic layer,
   wherein the first magnetic layer is formed by using a material with a base of a Gd—Fe film or a Gd—Fe—Co film in order to set a normalized magnetic field obtained by normalizing a magnetic domain wall driving field based on saturation magnetization lower than 1, the second magnetic layer is formed by using a material with a base of a Tb—Fe film or a Dy—Fe film, and adding at least one of Co, Al and Cr, the third magnetic layer is formed by using a material with a base of one of a Tb—Fe—Co film and a Dy—Fe—Co film, an element concentration ratio (at. % ratio) of one of Tb and Dy to Fe—Co is set in a range of one of 24.5≦Tb≦26.5 and 26.5≦5 Dy≦29.5, and addition amounts of Co and a nonmagnetic element to each magnetic layer are adjusted to set Curie temperatures Tc11, Tc12, and Tc13 of the first, second and third magnetic layers to Tc3≦Tc≦Tc2, whereby a stray field from the third magnetic layer to the first magnetic layer is reduced in a temperature range where a reproduction is carried out by the magnetic domain wall displacement.

2. A magneto-optical recording medium having multiple magnetic layers comprising:
   a first magnetic layer;
   a second magnetic layer;
   a third magnetic layer; and
   a fourth magnetic layer,
   the first to fourth magnetic layers being sequentially formed from a side irradiated with a laser beam, during recording, an information signal being recorded in a form of a magnetic domain in the fourth magnetic layer having an easy magnetization axis in a vertical direction by an external magnetic field while the laser beam irradiation is executed, then the magnetic domain being exchanged through the second and third magnetic layers with the first magnetic layer and, during reproducing, magnetization of the third magnetic layer being lost by a temperature raised by the laser beam irradiation, and magnetic domain wall displacement being generated to enlarge the magnetic domain formed by the exchange coupling in the first magnetic layer,
   wherein the first magnetic layer is formed by using a material with a base of one of a Gd—Fe film and a Gd—Fe—Co film in order to set a normalized magnetic field obtained by normalizing a magnetic domain wall driving field based on saturation magnetization lower than 1, each of the second and third magnetic layers is formed by using a material with a base of one of a Tb—Fe film and a Dy—Fe film, and adding at least one of Co, Al and Cr, the fourth magnetic layer is formed by using a material with a base of one of a Tb—Fe—Co film and a Dy—Fe—Co film, an element concentration ratio (at. % ratio) of one of Tb and Dy to Fe—Co is set in a range of one of 24.5≦TB≦26.5 and 26.5≦Dy≦29.5, and addition amounts of Co and a nonmagnetic element to each magnetic layer are adjusted to set Curie temperatures Tc21, Tc22, Tc23 and Tc24 of the first, second, third and fourth magnetic layers to Tc24>Tc21>Tc22>Tc23, whereby a stray field from the fourth magnetic layer to the first magnetic layer is reduced in a temperature range where a reproduction is carried, out by the magnetic domain wall displacement.

3. A magneto-optical recording medium having multiple magnetic layers comprising:
   a first magnetic layer;
   a second magnetic layer; and
   a third magnetic layer,
   the first to third magnetic layers being sequentially formed from a side irradiated with a laser beam, during recording, an information signal being recorded in a form of a magnetic domain in the third magnetic layer having an easy magnetization axis in a vertical direction by an external magnetic field while the laser beam irradiation is executed, then the magnetic domain being exchanged through the second magnetic layer with the first magnetic layer and, during reproducing, magnetization of the second magnetic layer being lost by a temperature raised by the laser beam irradiation, and magnetic domain wall displacement being generated to enlarge the magnetic domain formed by the exchange coupling in the first magnetic layer, wherein the first magnetic layer is formed by using a material with a base of one of a Gd—Fe film and a Gd—Fe—Co film in order to set a normalized magnetic field obtained by normalizing a magnetic domain wall driving field based on saturation magnetization lower than 1, the second magnetic layer is formed by using a material with a base of one of a Tb—Fe film and a Dy—Fe film, and adding at least one of Co, Al and Cr, the third magnetic layer is made of two films of a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first magnetic layer.

4. A magneto-optical recording medium having multiple magnetic layers comprising:
a first magnetic layer;
a second magnetic layer;
a third magnetic layer; and
a fourth magnetic layer, the first to fourth magnetic layers being sequentially formed from a side irradiated with a laser beam, during recording, an information signal being recorded in a form of a magnetic domain in the fourth magnetic layer having an easy magnetization axis in a vertical direction by an external magnetic field while the laser beam irradiation is executed, then the magnetic domain being exchanged through the second and third magnetic layers with the first magnetic layer and, during reproducing, magnetization of the third magnetic layer being lost by a temperature raised by the laser beam irradiation, and magnetic domain wall displacement being generated to enlarge the magnetic domain formed by the exchange coupling in the first magnetic layer, wherein the first magnetic layer is formed by using a material with a base of one of a Gd—Fe film and a Gd—Fe—Co film in order to set a normalized magnetic field obtained by normalizing a magnetic domain wall driving field based on saturation magnetization lower than 1, each of the second and third magnetic layers is formed by using a material with a base of one of a Tb—Fe film and a Dy—Fe film, and adding at least one of Co, Al and Cr, the fourth magnetic layer is made of two films of a Tb—Fe—Co film and a Gd—Fe—Co film, and anti-parallel coupling is maintained which becomes stable when directions of magnetizations of the two films are opposite to each other in a temperature area in which reproducing is executed by magnetic domain wall displacement in the first layer.

* * * * *

UNITED STATES PATENT AND TRADEMARK OFFICE
CERTIFICATE OF CORRECTION

PATENT NO. : 7,126,884 B2 Page 1 of 1
APPLICATION NO. : 10/337354
DATED : October 24, 2006
INVENTOR(S) : Tabata It is certified that error appears in the above-identified patent and that said Letters Patent is hereby corrected as shown below:

Claim 1, Column 28, Line 14,
Please delete
"$Tc3 \leq Tc \leq Tc2$" and replace with
-- $Tc13 > Tc11 > Tc12$ --

Signed and Sealed this

Second Day of January, 2007

JON W. DUDAS
*Director of the United States Patent and Trademark Office*